US012348743B2

United States Patent
Kwong et al.

(10) Patent No.: US 12,348,743 B2
(45) Date of Patent: Jul. 1, 2025

(54) METHOD AND SYSTEM FOR LEARNED VIDEO COMPRESSION

(71) Applicant: City University of Hong Kong, Kowloon (HK)

(72) Inventors: Sam Tak Wu Kwong, Kowloon (HK); Haifeng Guo, Kowloon (HK); Shiqi Wang, Kowloon (HK); Dongjie Ye, Kowloon (HK)

(73) Assignee: City University of Hong Kong, Kowloon (HK)

( * ) Notice: Subject to any disclaimer, the term of this patent is extended or adjusted under 35 U.S.C. 154(b) by 81 days.

(21) Appl. No.: 18/338,731

(22) Filed: Jun. 21, 2023

(65) Prior Publication Data
US 2024/0430463 A1      Dec. 26, 2024

(51) Int. Cl.
*H04N 19/42*      (2014.01)
*H04N 19/12*      (2014.01)
(Continued)

(52) U.S. Cl.
CPC ............. *H04N 19/42* (2014.11); *H04N 19/12* (2014.11); *H04N 19/139* (2014.11);
(Continued)

(58) Field of Classification Search
CPC .... H04N 19/12; H04N 19/139; H04N 19/172; H04N 19/176; H04N 19/60; H04N 19/85
(Continued)

(56) References Cited

U.S. PATENT DOCUMENTS

| 10,623,775 B1 | 4/2020 | Theis et al. |
| 10,977,553 B2 | 4/2021 | Rippel et al. |

(Continued)

FOREIGN PATENT DOCUMENTS

| AU | 2023272445 A1 * | 11/2024 | ............ G06F 40/284 |
| CN | 111405283 A | 7/2020 | |

(Continued)

OTHER PUBLICATIONS

R. Yang, F. Mentzer, L. Van Gool, and R. Timofte, "Learning for video compression with recurrent auto-encoder and recurrent probability model," IEEE Journal of Selected Topics in Signal Processing, vol. 15, No. 2, pp. 388-401, 2020.
(Continued)

*Primary Examiner* — Behrooz M Senfi
(74) *Attorney, Agent, or Firm* — Renner, Kenner, Greive, Bobak, Taylor & Weber

(57) ABSTRACT

There is provided a computer-implemented method for learned video compression, which includes processing a current frame ($x_t$) and previously decoded frame ($\hat{x}_{t-1}$) of a video data using a motion estimation model to estimate a motion vector ($v_t$) for every pixel, compressing the motion vector ($v_t$) and reconstructing the motion vector ($v_t$) to a reconstructed motion vector ($\hat{v}_t$), applying an enhanced context mining (ECM) model to obtain enhanced context ($\ddot{C}_E$) from the reconstructed motion vector ($\hat{v}_t$) and previously decoded frame feature ($\tilde{x}_{t-1}$), compressing the current frame ($x_t$) with the assistance of the enhanced context ($\ddot{C}_E$) to obtain a reconstructed frame ($\hat{x}'_t$), and providing the reconstructed frame ($\hat{x}'_t$) to a post-enhancement backend network to obtain a high-resolution frame ($\hat{x}_t$).

18 Claims, 18 Drawing Sheets

(51) Int. Cl.
  *H04N 19/139* (2014.01)
  *H04N 19/172* (2014.01)
  *H04N 19/176* (2014.01)
  *H04N 19/60* (2014.01)
  *H04N 19/85* (2014.01)

(52) U.S. Cl.
  CPC ......... *H04N 19/172* (2014.11); *H04N 19/176* (2014.11); *H04N 19/60* (2014.11); *H04N 19/85* (2014.11)

(58) Field of Classification Search
  USPC .................................................. 375/240.18
  See application file for complete search history.

(56) References Cited

U.S. PATENT DOCUMENTS

| | | | |
|---|---|---|---|
| 2023/0043350 A1* | 2/2023 | Choe .................... | H04N 19/593 |
| 2024/0146934 A1* | 5/2024 | Kwong ................. | H04N 19/13 |
| 2024/0364878 A1* | 10/2024 | Yin ....................... | H04N 19/174 |

FOREIGN PATENT DOCUMENTS

| | | | | |
|---|---|---|---|---|
| CN | 115034959 A | * | 9/2022 | ............... G06T 3/00 |
| CN | 118865048 A | * | 10/2024 | ............. G06V 10/82 |

OTHER PUBLICATIONS

R. Yang, F. Mentzer, L. V. Gool, and R. Timofte, "Learning for video compression with hierarchical quality and recurrent enhancement," in Proceedings of the IEEE Conference on Computer Vision and Pattern Recognition, 2020, pp. 6628-6637.
R. Pourreza and T. Cohen, "Extending neural p-frame codecs for b-frame coding," in Proceedings of the IEEE International Conference on Computer Vision, 2021, pp. 6680-6689.
V. Sze, M. Budagavi, and G. J. Sullivan, "High efficiency video coding (HEVC)," in Integrated Circuit and Systems, Algorithms and Architectures. Springer, 2014, vol. 39, p. 40.
Y. Dai, D. Liu, and F. Wu, "A convolutional neural network approach for post-processing in HEVC intra coding," in MultiMedia Modeling International Conference, 2017, pp. 28-39.
Y. Zhang, T. Shen, X. Ji, Y. Zhang, R. Xiong, and Q. Dai, "Residual highway convolutional neural networks for in-loop filtering in HEVC," IEEE Transactions on Image Processing, vol. 27, No. 8, pp. 3827-3841, 2018.
D. Ding, L. Kong, G. Chen, Z. Liu, and Y. Fang, "A switchable deep learning approach for in-loop filtering in video coding," IEEE Transactions on Circuits and Systems for Video Technology, vol. 30, No. 7, pp. 1871-1887, 2019.
C. Jia, S. Wang, X. Zhang, S. Wang, J. Liu, S. Pu, and S. Ma, "Content-aware convolutional neural network for in-loop filtering in high efficiency video coding," IEEE Transactions on Image Processing, vol. 28, No. 7, pp. 3343-3356, 2019.
Z. Pan, X. Yi, Y. Zhang, B. Jeon, and S. Kwong, "Efficient in-loop filtering based on enhanced deep convolutional neural networks for HEVC," IEEE Transactions on Image Processing, vol. 29, pp. 5352-5366, 2020.
A. Ranjan and M. J. Black, "Optical flow estimation using a spatial pyramid network," in Proceedings of the IEEE Conference on Computer Vision and Pattern Recognition, 2017, pp. 4161-4170.
Y. Tian, Y. Zhang, Y. Fu, and C. Xu, "TDAN: Temporally Deformable Alignment Network for Video Super-Resolution," in Proceedings of the IEEE Conference on Computer Vision and Pattern Recognition, 2020, pp. 3357-3366.
Y. Wu and K. He, "Group normalization," in Proceedings of the European Conference on Computer Vision, 2018, pp. 3-19.
J. Xu, X. Sun, Z. Zhang, G. Zhao, and J. Lin, "Understanding and improving layer normalization," Proceedings of Advances in Neural Information Processing Systems, vol. 32, 2019.

P. Luo, R. Zhang, J. Ren, Z. Peng, and J. Li, "Switchable normalization for learning-to-normalize deep representation," IEEE Transactions on Pattern Analysis and Machine Intelligence, vol. 43, No. 2, pp. 712-728, 2019.
D. Hendrycks and K. Gimpel, "Gaussian error linear units," arXiv preprint arXiv:1606.08415, 2016.
Z. Wang, E. P. Simoncelli, and A. C. Bovik, "Multiscale structural similarity for image quality assessment," in Asilomar Conference on Signals, Systems and Computers, vol. 2, 2003, pp. 1398-1402.
J. Ballé, V. Laparra, and E. P. Simoncelli, "End-to-end optimization of nonlinear transform codes for perceptual quality," in Picture Coding Symposium, 2016, pp. 1-5.
T. Xue, B. Chen, J. Wu, D. Wei, and W. T. Freeman, "Video enhancement with task-oriented flow," International Journal of Computer Vision, vol. 127, No. 8, pp. 1106-1125, 2019.
F. Bossen et al., "Common test conditions and software reference configurations," JCTVC-L1100, vol. 12, No. 7, 2013.
A. Mercat, M. Viitanen, and J. Vanne, "UVG dataset: 50/120fps 4k sequences for video codec analysis and development," in Proceedings of the ACM Multimedia Systems Conference, 2020, pp. 297-302.
H. Wang, W. Gan, S. Hu, J. Y. Lin, L. Jin, L. Song, P. Wang, I. Katsavounidis, A. Aaron, and C.-C. J. Kuo, "MCL-JCV: A JND-based H. 264/AVC video quality assessment dataset," in Proceedings of International Conference on Image Processing, 2016, pp. 1509-1513.
A. Paszke, S. Gross, F. Massa, A. Lerer, J. Bradbury, G. Chanan, T. Killeen, Z. Lin, N. Gimelshein, L. Antiga et al., "PyTorch: An imperative style, high-performance deep learning library," Proceedings of Advances in Neural Information Processing Systems, vol. 32, 2019.
J. Bégaint, F. Racapé, S. Feltman, and A. Pushparaja, "CompressAI: a PyTorch library and evaluation platform for end-to-end compression research," arXiv preprint arXiv:2011.03029, 2020.
I. Loshchilov and F. Hutter, "Decoupled weight decay regularization," arXiv preprint arXiv:1711.05101, 2017.
G. Bjontegaard, "Calculation of average PSNR differences between RD-curves (VCEG-M33)," in VCEG Meeting (ITU-T SG16 Q. 6), 2001, pp. 2-4.
H. Lee, H. Choi, K. Sohn, and D. Min, "Knn local attention for image restoration," in Proceedings of the IEEE/CVF Conference on Computer Vision and Pattern Recognition, 2022, pp. 2139-2149.
K. Zhang, W. Zuo, Y. Chen, D. Meng, and L. Zhang, "Beyond a Gaussian denoiser: Residual learning of deep CNN for image denoising," IEEE transactions on image processing, vol. 26, No. 7, pp. 3142-3155, 2017.
L. Torrey and J. Shavlik, "Transfer learning," in Handbook of research on machine learning applications and trends: algorithms, methods, and techniques. IGI global, 2010, pp. 242-264.
G. Lu, C. Cai, X. Zhang, L. Chen, W. Ouyang, D. Xu, and Z. Gao, "Content adaptive and error propagation aware deep video compression," 2020.
T. Wiegand, G. J. Sullivan, G. Bjontegaard, and A. Luthra, "Overview of the H. 264/AVC video coding standard," IEEE Transactions on Circuits and Systems for Video Technology, vol. 13, No. 7, pp. 560-576, 2003.
G. J. Sullivan, J.-R. Ohm, W.-J. Han, and T. Wiegand, "Overview of the high efficiency video coding (HEVC) standard," IEEE Transactions on Circuits and Systems for Video Technology, vol. 22, No. 12, pp. 1649-1668, 2012.
B. Bross, Y.-K. Wang, Y. Ye, S. Liu, J. Chen, G. J. Sullivan, and J.-R. Ohm, "Overview of the versatile video coding (VVC) standard and its applications," IEEE Transactions on Circuits and Systems for Video Technology, vol. 31, No. 10, pp. 3736-3764, 2021.
S. Ma, X. Zhang, C. Jia, Z. Zhao, S. Wang, and S. Wang, "Image and video compression with neural networks: A review," IEEE Transactions on Circuits and Systems for Video Technology, vol. 30, No. 6, pp. 1683-1698, 2019.
K. He, X. Zhang, S. Ren, and J. Sun, "Deep residual learning for image recognition," in Proceedings of the IEEE Conference on Computer Vision and Pattern Recognition, 2016, pp. 770-778.
A. Dosovitskiy, L. Beyer, A. Kolesnikov, D. Weissenborn, X. Zhai, T. Unterthiner, M. Dehghani, M. Minderer, G. Heigold, S. Gelly et

(56) References Cited

OTHER PUBLICATIONS al., "An image is worth 16x16 words: Transformers for image recognition at scale," in International Conference on Learning Representations, 2020.

Z. Liu, Y. Lin, Y. Cao, H. Hu, Y. Wei, Z. Zhang, S. Lin, and B. Guo, "Swin Transformer: Hierarchical vision transformer using shifted windows," in Proceedings of the IEEE International Conference on Computer Vision, 2021, pp. 10 012-10 022.

D. Liu, Y. Li, J. Lin, H. Li, and F. Wu, "Deep learning-based video coding: A review and a case study," ACM Computing Surveys, vol. 53, No. 1, pp. 1-35, 2020.

D. Ding, Z. Ma, D. Chen, Q. Chen, Z. Liu, and F. Zhu, "Advances in video compression system using deep neural network: A review and case studies," Proceedings of the IEEE, vol. 109, No. 9, pp. 1494-1520, 2021.

Y. Zhang, S. Kwong, and S. Wang, "Machine learning based video coding optimizations: A survey," Information Sciences, vol. 506, pp. 395-423, 2020.

J. Ballé, V. Laparra, and E. P. Simoncelli, "End-to-end optimized image compression," in International Conference on Learning Representations, 2017.

Z. Cheng, H. Sun, M. Takeuchi, and J. Katto, "Learned image compression with discretized Gaussian mixture likelihoods and attention modules," in Proceedings of the IEEE Conference on Computer Vision and Pattern Recognition, 2020, pp. 7939-7948.

G. Lu, W. Ouyang, D. Xu, X. Zhang, C. Cai, and Z. Gao, "DVC: An end-to-end deep video compression framework," in Proceedings of the IEEE International Conference on Computer Vision, 2019, pp. 11006-11015.

T. Ladune, P. Philippe, W. Hamidouche, L. Zhang, and O. Déforges, "Optical flow and mode selection for learning-based video coding," in IEEE International Workshop on Multimedia Signal Processing, 2020, pp. 1-6.

J. Li, B. Li, and Y. Lu, "Deep contextual video compression," Proceedings of Advances in Neural Information Processing Systems, vol. 34, pp. 18114-18125, 2021.

C. D. Pham, C. Fu, and J. Zhou, "Deep learning based spatial-temporal in-loop filtering for versatile video coding," in Proceedings of the IEEE Conference on Computer Vision and Pattern Recognition, 2021, pp. 1861-1865.

F. Zhang, C. Feng, and D. R. Bull, "Enhancing VVC through CNN-based post-processing," in Proceedings of International Conference on Multimedia and Expo, 2020, pp. 1-6.

D. Ma, F. Zhang, and D. R. Bull, "MFRNet: A new CNN architecture for post-processing and in-loop filtering," IEEE Journal of Selected Topics in Signal Processing, vol. 15, No. 2, pp. 378-387, 2020.

W. Fedus, B. Zoph, and N. Shazeer, "Switch Transformers: Scaling to Trillion Parameter Models with Simple and Efficient Sparsity," The Journal of Machine Learning Research, vol. 23, No. 1, pp. 5232-5270, 2022.

Y. Liu, M. Ott, N. Goyal, J. Du, M. Joshi, D. Chen, O. Levy, M. Lewis, L. Zettlemoyer, and V. Stoyanov, "RoBERTa: A Robustly Optimized BERT Pretraining Approach," arXiv preprint arXiv:1907.11692, 2019.

A. Vaswani, N. Shazeer, N. Parmar, J. Uszkoreit, L. Jones, A. N. Gomez, Ł. Kaiser, and I. Polosukhin, "Attention is all you need," Proceedings of Advances in Neural Information Processing Systems, vol. 30, 2017.

Y. Mei, Y. Fan, Y. Zhang, J. Yu, Y. Zhou, D. Liu, Y. Fu, T. S. Huang, and H. Shi, "Pyramid attention networks for image restoration," arXiv preprint arXiv:2004.13824, 2020.

S. W. Zamir, A. Arora, S. Khan, M. Hayat, F. S. Khan, and M.-H. Yang, "Restormer: Efficient transformer for high-resolution image restoration," in Proceedings of the IEEE Conference on Computer Vision and Pattern Recognition, 2022, pp. 5728-5739.

G. K. Wallace, "The JPEG still picture compression standard," IEEE Transactions on Consumer Electronics, vol. 38, No. 1, 1992.

C. Christopoulos, A. Skodras, and T. Ebrahimi, "The jpeg2000 still image coding system: an overview," IEEE Transactions on Consumer Electronics, vol. 46, No. 4, pp. 1103-1127, 2000.

F. Bellard, "BPG image format," 2015, [online available] at https://bellard.org/bpg/.

J. Ballé, D. Minnen, S. Singh, S. J. Hwang, and N. Johnston, "Variational image compression with a scale hyperprior," arXiv preprint arXiv:1802.01436, 2018.

D. Minnen, J. Ballé, and G. D. Toderici, "Joint autoregressive and hierarchical priors for learned image compression," Proceedings of Advances in Neural Information Processing Systems, vol. 31, 2018.

J. Lee, S. Cho, and S.-K. Beack, "Context-adaptive entropy model for end-to-end optimized image compression," arXiv preprint arXiv:1809.10452, 2018.

F. Mentzer, E. Agustsson, M. Tschannen, R. Timofte, and L. Van Gool, "Conditional probability models for deep image compression," in Proceedings of the IEEE Conference on Computer Vision and Pattern Recognition, 2018, pp. 4394-4402.

Y. Hu, W. Yang, and J. Liu, "Coarse-to-fine hyper-prior modeling for learned image compression," in Proceedings of the AAAI Conference on Artificial Intelligence, vol. 34, No. 07, 2020, pp. 11 013-11 020.

H. Liu, Y. Zhang, H. Zhang, C. Fan, S. Kwong, C.-C. J. Kuo, and X. Fan, "Deep learning-based picture-wise just noticeable distortion prediction model for image compression," IEEE Transactions on Image Processing, vol. 29, pp. 641-656, 2019.

G. Toderici, S. M. O'Malley, S. J. Hwang, D. Vincent, D. Minnen, S. Baluja, M. Covell, and R. Sukthankar, "Variable rate image compression with recurrent neural networks," arXiv preprint arXiv:1511.06085, 2015.

G. Toderici, D. Vincent, N. Johnston, S. Jin Hwang, D. Minnen, J. Shor, and M. Covell, "Full resolution image compression with recurrent neural networks," in Proceedings of the IEEE Conference on Computer Vision and Pattern Recognition, 2017, pp. 5306-5314.

N. Johnston, D. Vincent, D. Minnen, M. Covell, S. Singh, T. Chinen, S. J. Hwang, J. Shor, and G. Toderici, "Improved lossy image compression with priming and spatially adaptive bit rates for recurrent networks," in Proceedings of the IEEE Conference on Computer Vision and Pattern Recognition, 2018, pp. 4385-4393.

E. Agustsson, M. Tschannen, F. Mentzer, R. Timofte, and L. V. Gool, "Generative adversarial networks for extreme learned image compression," in Proceedings of the IEEE International Conference on Computer Vision, 2019, pp. 221-231.

F. Mentzer, G. D. Toderici, M. Tschannen, and E. Agustsson, "High-fidelity generative image compression," Proceedings of Advances in Neural Information Processing Systems, vol. 33, pp. 11 913-11 924, 2020.

T. Zhao, Y. Huang, W. Feng, Y. Xu, and S. Kwong, "Efficient VVC intra prediction based on deep feature fusion and probability estimation," IEEE Transactions on Multimedia, 2022.

L. Zhu, Y. Zhang, N. Li, G. Jiang, and S. Kwong, "Deep learning-based intra mode derivation for versatile video coding," ACM Transactions on Multimedia Computing, Communications and Applications, vol. 19, No. 2s, pp. 1-20, 2023.

G. Lu, X. Zhang, W. Ouyang, L. Chen, Z. Gao, and D. Xu, "An end-to-end learning framework for video compression," IEEE Transactions on Pattern Analysis and Machine Intelligence, vol. 43, No. 10, pp. 3292-3308, 2020.

Z. Hu, Z. Chen, D. Xu, G. Lu, W. Ouyang, and S. Gu, "Improving deep video compression by resolution-adaptive flow coding," in Proceedings of the European Conference on Computer Vision, 2020, pp. 193-209.

Z. Hu, G. Lu, and D. Xu, "FVC: A new framework towards deep video compression in feature space," in Proceedings of the IEEE Conference on Computer Vision and Pattern Recognition, 2021, pp. 1502-1511.

Z. Hu, G. Lu, J. Guo, S. Liu, W. Jiang, and D. Xu, "Coarse-To-Fine Deep Video Coding With Hyperprior-Guided Mode Prediction," in Proceedings of the IEEE Conference on Computer Vision and Pattern Recognition, 2022, pp. 5921-5930.

E. Agustsson, D. Minnen, N. Johnston, J. Ballé, S. J. Hwang, and G. Toderici, "Scale-space flow for end-to-end optimized video

(56) References Cited

OTHER PUBLICATIONS compression," in Proceedings of the IEEE Conference on Computer Vision and Pattern Recognition, 2020, pp. 8503-8512.

K. Lin, C. Jia, X. Zhang, S. Wang, S. Ma, and W. Gao, "DMVC: Decomposed motion modeling for learned video compression," IEEE Transactions on Circuits and Systems for Video Technology, 2022.

H. Guo, S. Kwong, C. Jia, and S. Wang, "Enhanced motion compensation for deep video compression," IEEE Signal Processing Letters, 2023 (submitted).

F. Mentzer, G. Toderici, D. Minnen, S.-J. Hwang, S. Caelles, M. Lucic, and E. Agustsson, "VCT: A video compression transformer," arXiv preprint arXiv:2206.07307, 2022.

X. Sheng, J. Li, B. Li, L. Li, D. Liu, and Y. Lu, "Temporal context mining for learned video compression," IEEE Transactions on Multimedia, 2022.

J. Li, B. Li, and Y. Lu, "Hybrid spatial-temporal entropy modelling for neural video compression," in Proceedings of the ACM International Conference on Multimedia, 2022, pp. 1503-1511.

J. Lin, D. Liu, H. Li, and F. Wu, "M-LVC: Multiple frames prediction for learned video compression," in Proceedings of the IEEE Conference on Computer Vision and Pattern Recognition, 2020, pp. 3546-3554.

\* cited by examiner

METHOD AND SYSTEM FOR LEARNED VIDEO COMPRESSION

TECHNICAL FIELD

The present invention generally relates to methods and systems for learned (learning-based) video compression.

BACKGROUND

Over the last few decades, video coding standards such as Advanced Video Coding (AVC) [1], high efficiency video coding (HEVC) [2], and versatile video coding (VVC) [3] follow the classical block-based hybrid video compression framework, and have been developed with various designs. However, with the rapid development of video usage and the introduction of Ultra-High-Definition video services, the growth of video data is beyond the improvement of compression ratio [4]. Therefore, it is important to explore video compression, e.g., for delivering high-quality video data at a given bit rate under the limited capabilities of networks and storage. As deep learning has been used and has achieved success [5]-[7] due to its powerful representation ability, learning-based compression has attracted interest and has achieved improvement, hence can be further explored [8]-[10].

For learning-based image compression, Balle' et al. proposes a basic CNN framework in [11]. They transform the image into latent code and then reconstruct it with an inverse transformation. To make the whole framework trainable end-to-end, uniform noise is added for quantization during the training process. With sufficient joint optimization training with a single loss function, learning-based image compression [12] with discretized Gaussian mixture likelihoods has achieved comparable performance with the latest traditional video standard VVC, revealing the effectiveness of neural networks in removing spatial redundancy.

In addition to spatial redundancy, temporal redundancy is another part to be reduced for video context. It has also made progress in learning-based video compression. Lu et al. proposes predictive end-to-end learned video compression framework (DVC) in [13]. In DVC, the residual between the input frame and the predicted frame is calculated. Then the motion vector and residual are separately compressed with the entropy model. However, the entropy of residue coding is greater than or equal to that of conditional coding [14]. Therefore, Li et al. proposes the deep contextual video compression framework (DCVC), which extracts a valuable context as a condition for the contextual encoder-decoder and entropy model to compress current frame [15]. Even though DCVC has been developed and, with the testing code released, has shown the effectiveness of conditional coding paradigm, improvements to DCVC may be desirable.

SUMMARY OF THE INVENTION

In DCVC there are only a resblock and a convolution layer for context refinement. Also, the context is generated without supervision and redundancy may exist among context channels. However, the context is important in the conditional framework as it will be introduced to the contextual encoder-decoder and entropy model for compression.

Therefore, some embodiments of the invention propose an enhanced context mining (ECM) model to reduce the redundancy across context channels. To take advantage of high-dimension context, specifically, some embodiments of the invention propose convolution and residual learning along with context channels. Thus, the latent clean context in the hidden layers is implicitly kept for contextual and entropy coding models.

Also, in DCVC, the error propagation problem exists. As shown in FIG. 1, the reconstructed errors are propagated to the next frame, resulting in degraded frame quality and increased bit consumption. Meanwhile, in-loop filtering in some video codecs may further improve reference frame quality for higher compression efficiency [16]-[18]. Inspired by the success of in-loop filtering in some of the video codecs, some embodiments of the invention performs learning-based video compression with a post-enhancement backend network and alleviate the error propagation problem in a GOP. Also, considering that transformers have shown good performances in dealing with natural language tasks [19], [20] and vision problems [21]-[23], some embodiments of the invention provide a transformer based post-enhancement backend network to improve the compression efficiency. Challenges in adapting the transformer to video arise from the high resolution of pixels and large variations in the scale of visual entities, which result in large computation and GPU memory consumption. Therefore, some embodiments of the invention provide a transposed gated transformer block to compute self-attention across channels rather than the spatial dimension. The attention map size may be $\mathbb{R}^{\hat{C} \times \hat{C}}$ instead of $\mathbb{R}^{\hat{H}\hat{W} \times \hat{H}\hat{W}}$. Considering that down/up sampling would lead to information loss and inevitably introduce artifacts, some embodiments of the invention provide a full-resolution pipeline. Meanwhile, the transformer block without layer normalization is designed to prevent performance degradation (the benefit of removing layer normalization is demonstrated in an ablation study). Some embodiments of the invention design the transformer structure into the in-looping of learning-based video compression task, which is feasible for high-resolution frames with a single GPU.

In some embodiments of the invention, with the enhanced context mining model and transformer-based post-enhancement backend network, less error propagation and better compression efficiency can be obtained. Meanwhile, the proposed models in some embodiments may be extended to other learned coding methods that are extended from the DCVC framework. Some example contributions of some embodiments of the invention include:

(i) An enhanced context mining (ECM) model is proposed to reduce the redundancy across context channels. Convolution and residual learning are operated to obtain a latent clean context. The enhanced context is introduced into the contextual encoder-decoder and entropy model.

(ii) A transformer-based post-enhancement backend network is included in the deep video compression network to further alleviate the error propagation problem. In particular, a full-resolution pipeline is provided for the backend network as the down-/up sampling would introduce artifacts and information loss. Moreover, transposed gated transformer block without layer normalization is devised and self-attention across channels is computed (rather than spatial dimension) to reduce computation and GPU memory consumption, making the whole framework feasible for the high-resolution frame with a single GPU.

(iii) With the enhanced context mining model and transformer-based post-enhancement network, a double-enhanced video compression framework is provided. The whole network is jointly optimized to exploit spatial and temporal information. Experiments and analysis are performed to verify the effectiveness of the model in one embodiment, which achieves 6.7% bit savings compared with low-delay P (LDP) configurations of versatile video coding (VVC) in terms of MS-SSIM metric. For the PSNR metric, the model in one embodiment outperforms HEVC with 36.40% average bit savings, up to 46.33% savings for UVG sequences and 41.06% savings for HEVC Class B sequences.

According to an aspect of the invention, there is provided a computer-implemented method for learned video compression, which includes processing a current frame ($x_t$) and previously decoded frame ($\hat{x}_{t-1}$) of a video data using a motion estimation model to estimate a motion vector ($v_t$) for every pixel, compressing the motion vector ($v_t$) and reconstructing the motion vector ($v_t$) to a reconstructed motion vector ($\hat{v}t$), applying an enhanced context mining (ECM) model to obtain enhanced context ($\ddot{C}_E$) from the reconstructed motion vector ($\hat{v}t$) and previously decoded frame feature ($\tilde{x}_{t-1}$), compressing the current frame ($x_t$) with the assistance of the enhanced context ($\ddot{C}_E$) to obtain a reconstructed frame ($\hat{x}'_t$), and providing the reconstructed frame ($\hat{x}'_t$) to a post-enhancement backend network to obtain a high-resolution frame ($\hat{x}_t$).

In some embodiments, the motion estimation model may be based on a spatial pyramid network.

In some embodiments, applying the enhanced context mining (ECM) model may include utilizing cross-channel interaction and residual learning operation to reduce redundancy across context channels.

In some embodiments, applying the enhanced context mining model (ECM) may include obtaining the motion vector ($\hat{v}_t$) and decoded frame feature ($\tilde{x}_{t-1}$) based on the current input frame ($x_t$) and previously decoded frame ($\hat{x}_{t-1}$), warping the motion vector ($\hat{v}t$) and decoded frame feature ($\tilde{x}_{t-1}$) to obtain a warped feature ($\ddot{x}_t$), and processing the warped feature ($\ddot{x}_t$) using a resblock and convolution layer to obtain a context ($\dddot{x}_t$).

In some embodiments, applying the enhanced context mining (ECM) model may further include incorporating convolution with ReLU on the context ($\dddot{x}_t$) to obtain residual context ($R_C$), and adding the residual context ($R_C$) to the context ($\dddot{x}_t$) to obtain the enhanced context ($\ddot{C}_E$).

In some embodiments, incorporating convolution with ReLU on the context ($\dddot{x}_t$) may include passing the context ($\dddot{x}_t$) through multiple layers of convolution and ReLU followed by one more convolution layer.

In some embodiments, the enhanced context mining (ECM) model may be designed without batch normalization layers.

In some embodiments, compressing the current frame ($x_t$) may include concatenating the input frame ($x_t$) and the enhanced context ( ) together, processing the input frame ($x_t$) and the enhanced context ($\ddot{C}_E$) to obtain latent code ($y_t$) for entropy model, and transforming the latent code back to pixel space with the assistance of the enhanced context ($\ddot{C}_E$) to obtain the reconstructed frame ($\hat{x}'_t$).

In some embodiments, the post-enhancement backend network may be transformer-based.

In some embodiments, the post-enhancement backend network may include multiple transposed gated transformer blocks (TGTBs) and multiple convolution layers.

In some embodiments, providing the reconstructed frame ($\hat{x}'_t$) to the post-enhancement backend network may include applying a convolution layer to the reconstructed frame ($\hat{x}'_t$) to obtain a low-level feature embedding $F_0 \in \mathbb{R}^{H \times W \times C}$, where H×W is the spatial height and width, and C denotes the channel numbers, and processing the low-level feature ($F_0$) using one or more transformer blocks to obtain a refined feature ($F_R$), and applying a convolution layer to the refined feature (FR) to obtain residual image $R \in \mathbb{R}^{H \times W \times 3}$ to which the reconstructed frame ($\hat{x}'_t$) is added to obtain $\hat{x}'_t : x_t = \hat{x}'_t + R$.

In some embodiments, at least one of the transformer blocks may include a transposed gated transformer block (TGTB) which is designed without layer normalization.

In some embodiments, at least one of the transformer blocks may be modified to contain a multi-head transposed attention (MTA) and a gated feed-forward network (GFN).

In some embodiments, the multi-head transposed attention (MTA) may include calculating self-attention across channels.

In some embodiments, the multi-head transposed attention (MTA) may include applying depth-wise convolution.

In some embodiments, the multi-head transposed attention (MTA) may generate, from a feature input $\hat{X} \in \mathbb{R}^{H \times W \times C}$, query (Q), key (K) and value (V) projections with the local context, and reshape the query (Q) to $\hat{H}\hat{W} \times \hat{C}$, and key (K) to $\hat{C} \times \hat{H}\hat{W}$, to obtain a transposed attention map of size $\mathbb{R}^{\hat{C} \times \hat{C}}$.

In some embodiments, the gated feed-forward network (GFN) may include gating mechanism and depth wise convolutions, the gating mechanism may be achieved as the element-wise product of two parallel paths of transformation layers, one of which is activated with the GELU non-linearity, and the depth-wise convolution may be applied to obtain information from spatially neighboring pixel positions.

In another aspect of the invention, there is provided a system for learned video compression, which includes one or more processors, and memory storing one or more programs configured to be executed by the one or more processors. The one or more programs include instructions for performing or facilitating performing of the computer-implemented method as aforementioned.

In some embodiments, there is provided a system for learned video compression. The system includes a motion estimation model configured to receive a current frame ($x_t$) and previously decoded frame ($\hat{E}_{t-1}$) of a video data to estimate a motion vector ($v_t$) for every pixel, a motion vector (MV) encoder and decoder configured to compress the motion vector ($v_t$) and to reconstruct the motion vector ($v_t$) to a reconstructed motion vector ($\hat{v}_t$), an enhanced context mining (ECM) model configured to obtain enhanced context ($\ddot{C}_E$) from the reconstructed motion vector ($\hat{v}_t$) and previously decoded frame feature ($\tilde{x}_{t-1}$), a contextual encoder and decoder configured to compress the current frame ($x_t$) with the assistance of the enhanced context ($\ddot{C}_E$) to obtain a reconstructed frame ($\hat{x}'_t$), and a post-enhancement backend network configured to obtain a high-resolution frame ($\hat{x}_t$) based on the reconstructed frame ($\hat{x}'_t$).

In some embodiments, the motion estimation model may be based on a spatial pyramid network.

In some embodiments, the enhanced context mining (ECM) model may be configured to utilize cross-channel interaction and residual learning operation to reduce redundancy across context channels.

In some embodiments, the enhanced context mining model (ECM) may be configured to obtain the motion vector ($\hat{v}_t$) and decoded frame feature ($\tilde{x}_{t-1}$) based on the current input frame ($x_t$) and previously decoded frame ($\hat{x}_{t-1}$), warp the motion vector ($\hat{v}t$) and decoded frame feature ($\tilde{x}_{t-1}$) to obtain a warped feature ($\ddot{x}_t$), and process the warped feature ($\ddot{x}_t$) by using a resblock and convolution layer to obtain a context ($\dddot{x}_t$).

In some embodiments, the enhanced context mining (ECM) model may further be configured to incorporate convolution with ReLU on the context ($\ddot{x}_t$) to obtain residual context ($R_C$), and add the residual context ($R_C$) to the context ($\ddot{x}_t$) to obtain the enhanced context ($\ddot{C}_E$).

In some embodiments, the enhanced context mining (ECM) model may be configured to incorporate convolution with ReLU on the context ($\ddot{x}_t$) by passing the context ($\ddot{x}_t$) through multiple layers of convolution and ReLU followed by one more convolution layer.

In some embodiments, the enhanced context mining (ECM) model may be designed without batch normalization layers.

In some embodiments, the contextual encoder and decoder may be configured to compress the current frame ($x_t$) by concatenating the input frame ($x_t$) and the enhanced context ($\ddot{C}_E$) together, feeding the input frame ($x_t$) and the enhanced context ($\ddot{C}_E$) into the contextual encoder to obtain latent code ($y_t$) for entropy model, and transforming the latent code back to pixel space with the assistance of the enhanced context ($\ddot{C}_E$) by the contextual decoder to obtain the reconstructed frame ($\hat{x}'_t$).

In some embodiments, the post-enhancement backend network may be transformer-based.

In some embodiments, the post-enhancement backend network may include multiple transposed gated transformer blocks (TGTBs) and multiple convolution layers.

In some embodiments, the post-enhancement backend network may be configured to obtain the high-resolution frame ($\hat{x}_t$) by applying a convolution layer to the reconstructed frame ($\hat{x}'_t$) to obtain a low-level feature embedding $F_0 \in \mathbb{R}^{H \times W \times C}$, where H×W is the spatial height and width, and C denotes the channel numbers, feeding the low-level feature ($F_0$) through one or more transformer blocks to obtain a refined feature (FR), and applying a convolution layer to the refined feature (FR) to obtain residual image $R \in \mathbb{R}^{H \times W \times 3}$ to which the reconstructed frame ($\hat{x}'_t$) is added to obtain $\hat{x}'_t$: $\hat{x}_t = \hat{x}'_t + R$.

In some embodiments, at least one of the transformer blocks may include a transposed gated transformer block (TGTB) which is designed without layer normalization.

In some embodiments, at least one of the transformer blocks may be modified to contain a multi-head transposed attention (MTA) and a gated feed-forward network (GFN).

In some embodiments, the multi-head transposed attention (MTA) may be configured to calculate self-attention across channels.

In some embodiments, the multi-head transposed attention (MTA) may be configured to apply depth-wise convolution.

In some embodiments, the multi-head transposed attention (MTA) may be configured to generate, from a feature input $X \in \mathbb{R}^{H \times W \times C}$, query (Q), key (K) and value (V) projections with the local context, and to reshape the query (Q) to $\hat{H}\hat{W} \times \hat{C}$, and key (K) to $\hat{C} \times \hat{H}\hat{W}$ to obtain a transposed attention map of size $\mathbb{R}^{\hat{C} \times \hat{C}}$.

In some embodiments, the gated feed-forward network (GFN) may include gating mechanism and depth wise convolutions, the gating mechanism may be achieved as the element-wise product of two parallel paths of transformation layers, one of which is activated with the GELU non-linearity, and the depth-wise convolution may be applied to obtain information from spatially neighboring pixel positions.

In yet another aspect of the invention, there is provided a non-transitory computer readable medium having instructions stored thereon which, when executed by one or more processors, cause the one or more processors to execute the computer-implemented method as aforementioned.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF DRAWINGS

Embodiments of the invention will now be described, by way of example, with reference to the accompanying drawings in which:

Figure 13:
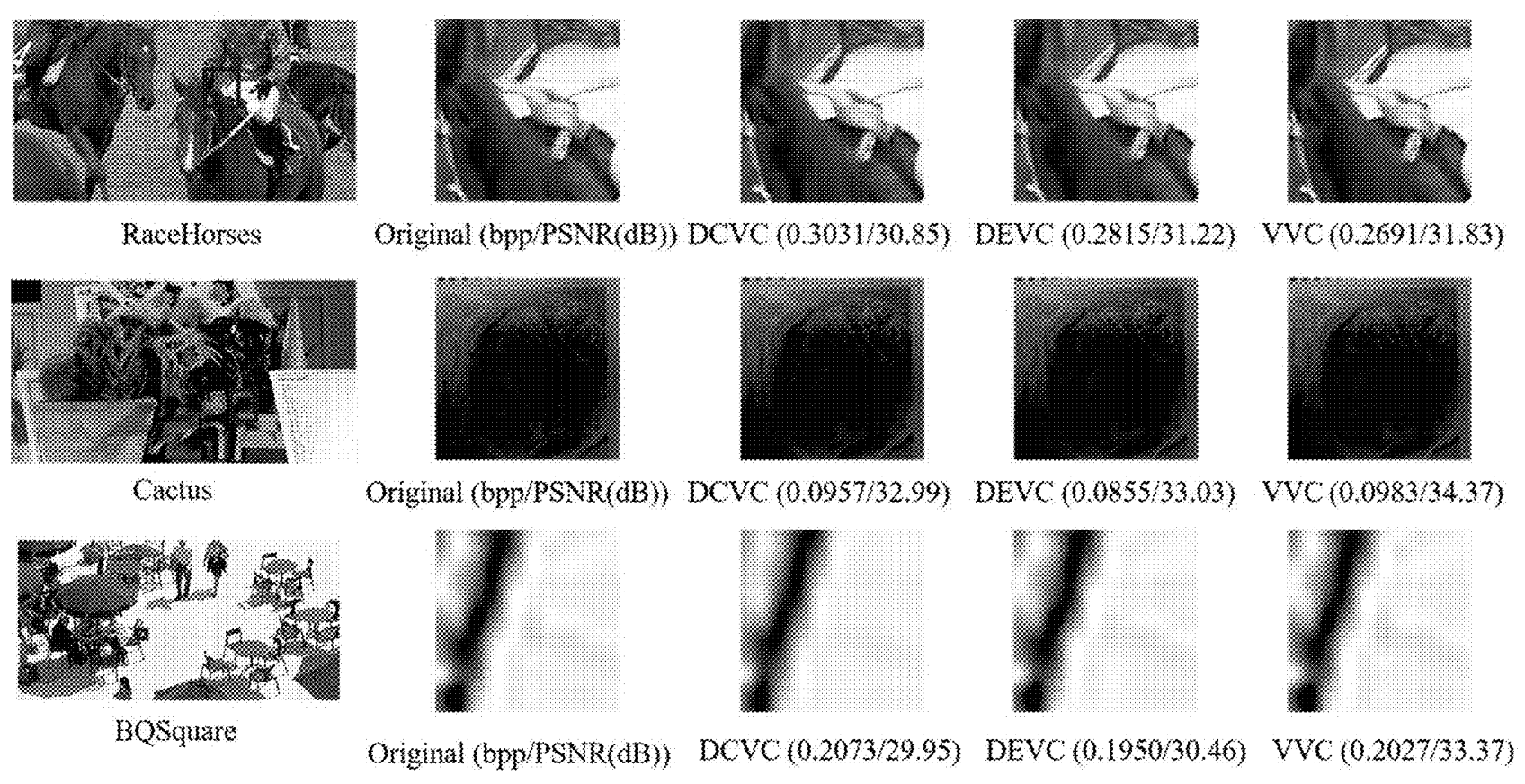

FIG. 13 shows subjective quality comparison among VVC, the DEVC embodiment, and DCVC.

Figure 1:
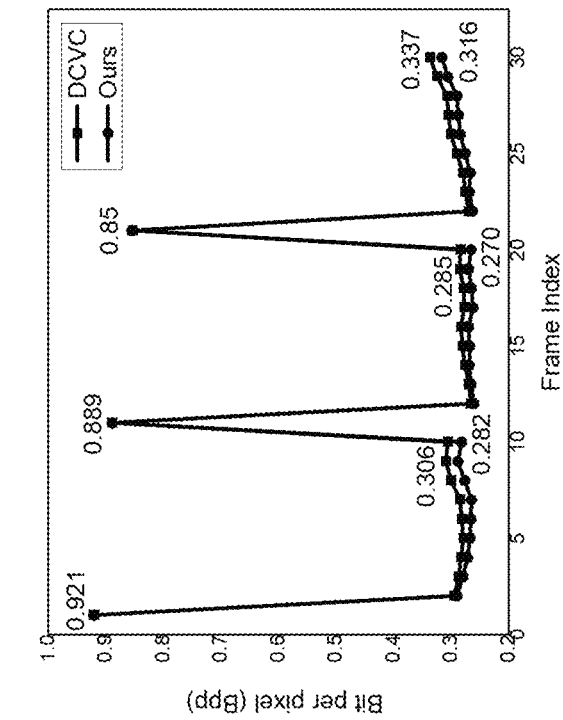
FIG. 1 shows an example of Peak Signal-to-Noise Ratio (PSNR) and bit cost comparison between DCVC and an embodiment of the invention (GOP=10).
Figure 1:
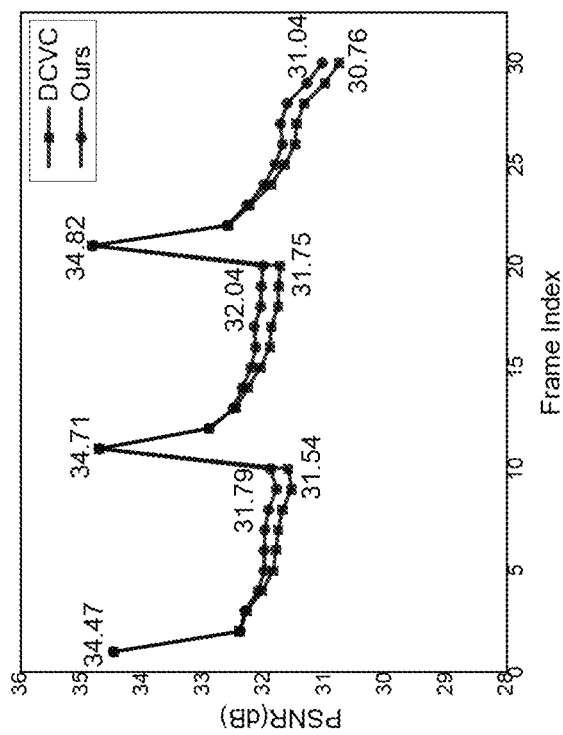

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Hereinafter, some embodiments of the invention will be described in detail with reference to the drawings.

The deep contextual video compression framework (DCVC) with conditional coding paradigm extracts a context and takes the context as a condition of the contextual encoder decoder and entropy model. However, the generation of critical context remains challenging. Some embodiments of the invention propose an enhanced context mining model to reduce the redundancy across context channels, where cross-channel interaction and residual learning are utilized to obtain better context features. Moreover, inspired by the success of in-loop filtering in traditional codecs, some embodiments of the invention provide a transformer-based post-enhancement network designed to alleviate the error propagation problem. Specifically, some embodiments of the invention propose a full resolution pipeline without down/up sampling for the in-loop filtering without information damage. In addition, to reduce the large computation and memory consumption of the transformer, some embodiments of the invention propose a transposed gated transformer block to calculate self-attention across channels rather than the spatial dimension. With the above designs, the whole framework is feasible for high-resolution frames and can be jointly optimized to exploit spatial and temporal information.

Related Work

A. Learned Image Compression

Deep learning-based image compression has been a popular topic with end-to-end training. Rather than manually designing components empirically, such as JPEG [24], JPEG2000 [25], and BPG [26], the learning-based image compression maps the image to latent code with a nonlinear network-based transform. After that, the latent code is quantized and written into the bitstream. Subsequently, the image could be reconstructed from latent code with an inverse transformation. In [11], the whole trainable framework, which could be jointly optimized by the estimated bit cost and reconstructed image quality, is proposed. Specifically, Balle' et al. adds uniform noise to the quantized latent code as a soft approximation during the training process and estimates the bit cost with a factorized entropy model. Later, Balle' et al. further proposes to take advantage of side information-related hyperprior to reduce spatial redundancy of latent code in [27], and the latent code is modeled as a zero-mean Gaussian with its own standard deviation. Moreover, autoregressive priors are incorporated into the entropy model in [28], [29] with a masked convolution network. Meanwhile, Fabian Mentzer et al. proposes to use 3D-CNN to learn a conditional probability model of latent code in [30] and Hu et al. proposes a coarse to fine entropy model to take advantage of different layers' hyper priors [31]. Furthermore, Cheng et al. proposes flexible Gaussian Mixture Likelihoods to parameterize the distributions of latent codes, achieving comparable performance with Versatile Video Coding (VVC) in [12]. In addition to CNN-based frameworks [32], recurrent neural network-based methods [33]-[35] and GAN-based frameworks [36], [37] are also proposed for learned image compression.

B. Learned Video Compression

Besides image compression, the past few years also have witnessed a rapid development of learning-based video compression [38], [39]. Lu et al. proposes the first low delay predictive end-to-end video compression framework (DVC) in [13], [40] and all components are implemented with neural networks, optimizing with a single rate-distortion tradeoff loss. At this time, optical flow replaced typical MVs to estimate motion, while motion compensation relied on reconstructed MVs. Then the MVs and residuals between prediction and ground truth are separately coded by the image compression method. Based on DVC, Hu et al. further proposes adaptive flow coding, introducing multi-resolution representations at block and frame levels in [41]. Then, Hu et al. presented a feature space video compression framework (FVC), achieving great compression performance improvement. In FVC, motion estimation, compensation, compression and residual compression are operated on feature space instead of pixel space [42]. Subsequently, a coarse-to-fine deep video compression framework based on multi-resolution and feature space operation for better compensation is presented in [43]. To better handle motion, Agustsson et al. proposes a scale-space flow for learned video compression [44]. Moreover, Lin et al. proposes a decomposed motion paradigm (DMVC) for learned video compression in [45]. Enhanced motion compensation is proposed to generate a better predicted frame in [46]. In addition, Fabian et al. proposes Video Compression Transformer (VCT) to directly learn the relationship between frames [47].

In addition to the above methods, it is worth mentioning that Li et al. shifted the predictive coding paradigm to the conditional coding paradigm and propose the deep contextual video compression framework (DCVC) in [15]. Subsequently, Sheng et al. proposes to extract multi-scale temporal contexts and maintain the propagated feature based on the conditional coding paradigm (DCVC) [48]. Furthermore, on top of conditional coding, Li et al. proposes a hybrid spatial temporal entropy model, combining the contribution of for learned video compression in [49]. Different from [46], [48], [49], the embodiments of the present invention focus on the generation of a better context with conditional coding paradigm [15].

Not limited to the previous frame as a reference, Lin et al. proposes multiple frame prediction to generate multiple MV fields in [50]. Yang et al. introduces recurrent neural network into video compression in [51] and proposes a Hierarchical Learned Video Compression (HLVC) framework with three hierarchical quality layers and a recurrent enhancement network in [52]. Reza et al. proposes to extend P-frame codecs to B-frame coding with a frame interpolation method in [53].

C. In Loop Filtering

Deblocking filter and sample adaptive offset [54] are two in-loop filters, specified in HEVC [2] and VVC [3]. They are applied after the inverse quantization and before saving the frame to the decoded frame buffer. In particular, the deblocking filter is designed to weaken the discontinuities at the prediction and transformation block boundaries. Sample adaptive offset improves the frame quality after the deblocking filter by attenuating ringing artifacts. Using the two in-loop filters, a better quality reference frame can be obtained and hence the compression efficiency is improved.

With the development of deep learning, researchers have explored deep learning-based in-loop filtering enhancement in HEVC and VVC. Dai et al. [55] proposes a variable filter size residue-learning CNN (VRCNN) to improve the compression performance. Moreover, residual highway units [56], switchable deep learning approach [57], context-aware CNN [58] and enhanced deep convolutional neural networks

[59] are proposed for in-loop filtering in HEVC. Later, Pham et al. proposes a learning-based spatial-temporal in-loop filtering to improve VVC default in-loop filtering, by taking advantage of coding information [16]. Zhang et al. proposes another specified CNN to enhance the Random Access (RA) mode in VVC [17]. Moreover, Ma et al. designed an MFRNet for post-processing and in-loop filtering for traditional video compression in [18].

Although in-loop filtering has been investigated and exploited in traditional video compression, the in-loop enhancement for end-to-end video compression is still awaiting more exploration. The embodiments of the present invention design a post-enhancement backend network and improve the end-to-end video compression efficiency further.

Method

A. The Overall Framework

Figure 2:
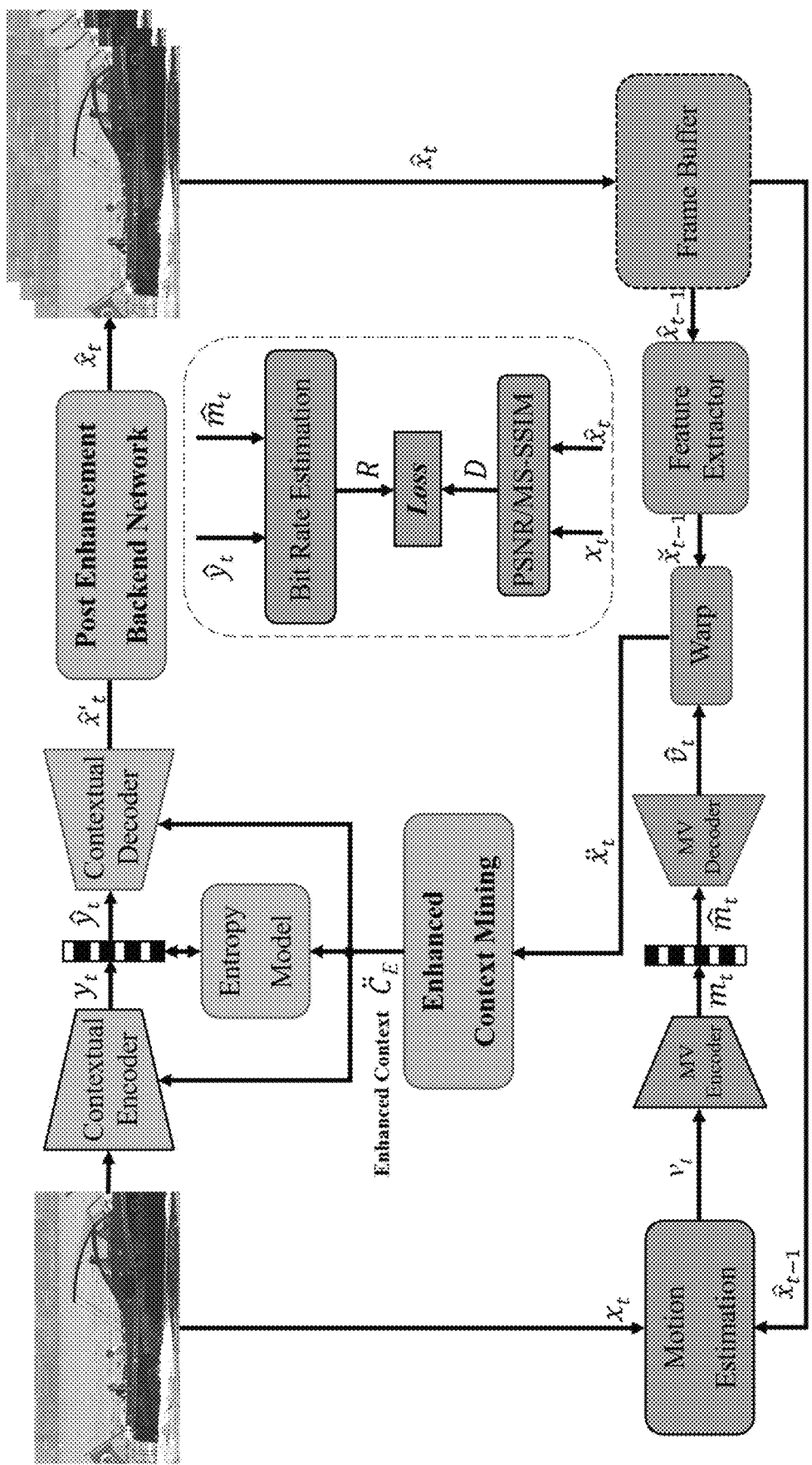
FIG. 2 shows a schematic illustration of an overall framework of Double Enhanced Modeling for Learned Video Compression according to an embodiment of the invention.

FIG. 2 shows the overall framework of Double Enhanced Modeling for Learned Video Compression in one embodiment. Let $x_t$ denote the current frame, the motion vector (MV) $v_t$ is estimated between $x_t$ and previously decoded frame $\hat{x}_{t-1}$ by motion estimation, then MV is encoded and reconstructed to $\hat{v}t$ through MV encoder and decoder. Context $\breve{x}t$ is obtained by warping reconstructed motion vector $\hat{v}t$ and previously decoded frame feature $\breve{x}_{t-1}$. An Enhanced Context Mining (ECM) is proposed to learn enhanced context $\ddot{C}_E$, then $\ddot{C}_E$ is fed into contextual encoder-decoder and entropy model to compress $x_t$ and reconstruct to $\hat{x}'_t$. Post Enhancement Backend Network is designed to further improve $\hat{x}'_t$ to frame $\hat{x}_t$. $\hat{x}_t$ is stored to frame buffer for future reference. $m_t$, $y_t$ is the latent representation and $\hat{m}_y$, $\hat{y}_t$ is the corresponding quantized version. The encoder uses all the modules, and the decoder only contains the modules with light gray borders. The whole framework is optimized through rate-distortion (RD) loss. The overall framework in FIG. 2 will be further described below.

The overall framework of the proposed method is shown in FIG. 2, obtaining the feature context $\ddot{C}_E$ with the previously decoded frame $\hat{x}_{t-1}$ and taking $\ddot{C}_E$ as a condition to encode-decode current frame x, to reconstructed frame $\hat{x}$t, which can be formulated as, $$\hat{x}_t = f_{dec}([f_{enc}(x_t | \ddot{C}_E)] | \ddot{C}_E) \qquad (1)$$

with $$\ddot{C}_E = f_{context}(\hat{x}_{t-1})$$

where $f_{context}(*)$ is the context generation function. $f_{enc}(*)$ and $f_{dec}(*)$ represent the contextual encoder and decoder. The pipeline of the whole framework is as follows.

First, the current frame $x_t$ and previously decoded frame $\hat{x}_{t-1}$ are fed into the motion estimation model to estimate optical flow, which is treated as the estimated motion vector $v_t$ for every pixel. After obtaining the motion vector $v_t$, the MV encoder-decoder is used to compress $v_t$ and obtain the reconstructed motion vector $\hat{v}$t. Next, enhanced context mining is applied to learn contexts $\ddot{C}_E$ from the reconstructed motion vector $\hat{v}$t and previously decoded frame feature $\breve{x}_{t-1}$. Then the enhanced context $\ddot{C}_E$ is refilled into the contextual encoder-decoder and entropy model to compress the current frame $x_t$. After the contextual decoder, the reconstructed frame $\hat{x}'_t$ is obtained. Considering that in-loop filtering can further improve compression efficiency, the $\hat{x}'_t$ is fed into the proposed transformer-based post-enhancement backend network to generate $\hat{x}_t$. Then $\hat{x}_t$ is stored and propagated for the next frame compression.

According to some embodiments, the motion estimation model is based on the spatial pyramid network (Spynet) [60]. Moreover, some embodiments follow DCVC [15] method to refill the context into the contextual encoder-decoder and entropy model.

The main components of the framework in FIG. 2 include:

Motion Estimation: The current frame $x_t$ and previously decoded frame $\hat{x}_{t-1}$ are fed into the motion estimation model to estimate optical flow, to exploit the temporal relationship. The optical flow is treated as the estimated motion vector v, for every pixel. According to an embodiment, the motion estimation model is based on the spatial pyramid network (Spynet).

MV Encoder-Decoder: After obtaining the motion vector $v_t$, the MV encoder-decoder is used to compress and reconstruct the motion vector $v_t$. $\hat{v}_t$ is the reconstructed motion vector.

Enhanced Context Mining: An enhanced context mining is proposed to learn richer contexts $\hat{C}_E$ from the reconstructed motion vector $\hat{v}$t and previously decoded frame feature $\breve{x}_{t-1}$. Then the enhanced context $\ddot{C}_E$ is refilled into the contextual encoder-decoder and entropy model to improve the compression efficiency. The details of the enhanced context mining model will be further described below in Item B.

Contextual Encoder-Decoder: With the assistance of enhanced context CE, the contextual encoder and decoder are used to compress the current frame $x_t$. According to an embodiment, DCVC can be used to concatenate the context $\ddot{C}_E$ to the frame $x_t$, and then feed into contextual encoder-decoder.

Post Enhancement Backend Network: After the contextual decoder, the reconstructed frame $\hat{x}'_t$ is obtained. Considering that in-loop filtering can further improve the compression efficiency, a transformer based post-enhancement backend network is proposed to further improve compression efficiency, which will be further described below in Item C.

Entropy Model: For the entropy model, the hierarchical priors and spatial priors and context temporal priors are fused together with Laplacian distribution to model the contextual latent code. In addition, the MV latent codes also have a corresponding entropy model. However, only the spatial and hyperprior priors are applied for MV latent codes according to an embodiment. Moreover, the arithmetic coder is implemented to write and read bitstream.

The details of the proposed enhanced context mining model and transformer-based post enhancement backend network are further provided below.

B. Enhanced Context Mining

Figure 3:
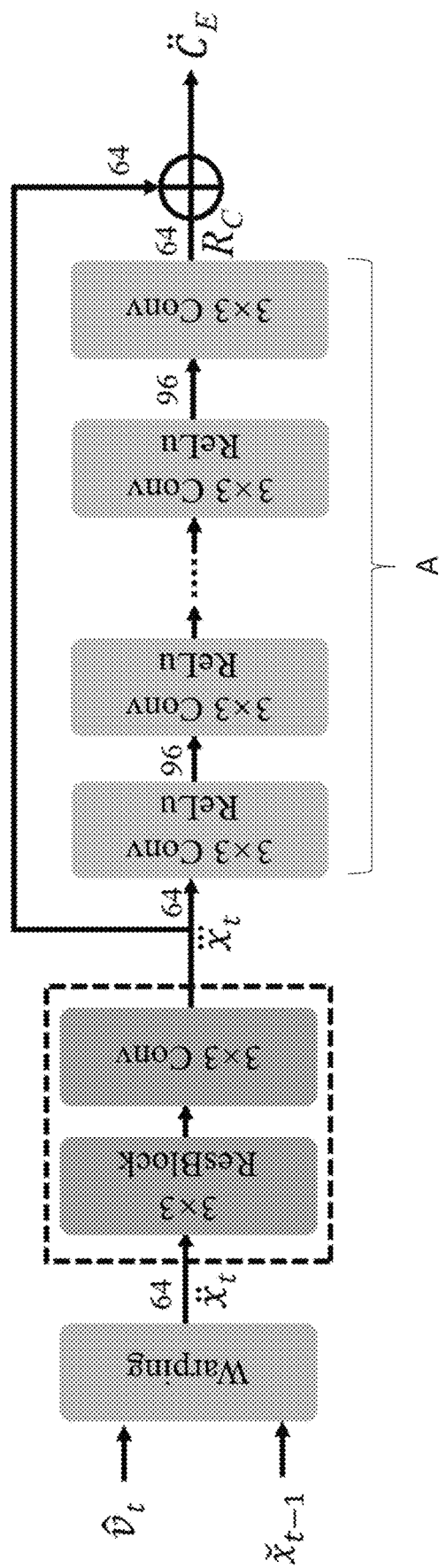
FIG. 3 shows an example architecture of enhanced context mining model according to an embodiment of the invention.

It can be seen from the overall framework that context is critical as it assists the contextual encoder-decoder and entropy model to compress the current frame. However, there is inaccurate motion estimation information via optical flow [61] and it may introduce artifacts in the bi-linear warping phase of $\hat{x}$t and $\breve{x}_{t-1}$. To make full use of the high-dimension context feature, it is proposed to reduce the redundancy across context channels with convolution operation and residual learning. The proposed enhanced context mining model in one embodiment is shown in FIG. 3. The numbers represent the channel dimensions. With the current input frame $x_t$ and previously decoded frame $\hat{x}_{t-1}$, the motion vector $\hat{v}_t \in \mathbb{R}^{2 \times H \times W}$ and decoded frame feature $\breve{x}_{t-1} \in \mathbb{R}^{C \times H \times W}$ are obtained for context feature generation, where the channel number of frame feature is set as 64 in [15]. To align the channel number of $\hat{v}_t$ and $\bar{x}_{t-1}$, bi-linear interpolation is applied as a warping operation to obtain warped feature $\bar{x}_t$, which contains the motion information and previous frame feature simultaneously. Then warped feature $\bar{x}_t$ is fed into a ResBlock and convolution layer to obtain the context $\ddot{x}_t$. In DCVC [15], the context $\ddot{x}_t$ is refilled into contextual encoder-decoder and entropy model as a condition for compression. In this way, the context $\ddot{x}_t$ is generated without supervision and redundancy may exist among context $\ddot{x}_t$ channels. Therefore, it is proposed to reduce the redundancy with cross-channel interaction and residual learning operation. By incorporating convolution with ReLU, the network can gradually separate context structure from the redundancy observation through the hidden layers and obtain the residual context $R_C$. Finally, the residual context $R_C$ is added to $\ddot{x}_t$ to obtain enhanced context $\ddot{C}_E$. The whole process of enhanced context mining is formulated as follows.

$$\bar{x}_t = \text{Bilinear-Wrap}(\bar{x}_{t-1}, \hat{v}_t) \quad (2)$$

$$\ddot{x}_t = W_c^0 ResBlock(\bar{x}_t) \quad (3)$$

$$\ddot{C}_E = W_c^1 W_{cr}^1(\ddot{x}_t) + \ddot{x}_t \quad (4)$$

where $W_c^{(\cdot)}$ represents the convolution layer and $W_{cr}^{(\cdot)}$ represents the convolution plus ReLu layer. This example sets six layers of convolution+ReLU followed by one more convolution layer for the A part in FIG. 3. In addition, Wu et al. points out that batch normalization works well when the batch size is larger than 16. When the batch size is smaller than 16, batch normalization will degrade performance. Because of GPU memory limitation for high-resolution video, the training batch size is set as 4 or 8 in the previous learning-based video compression works [42]-[44]. According to an embodiment, the training batch size is set as 8. To prevent performance degradation, the enhanced context mining model is designed without batch normalization layers.

After obtaining the enhanced context $\ddot{C}_E$, the enhanced context $\ddot{C}_E$ is refilled into the learned video compression framework, including contextual encoder-decoder and entropy model. With the enhanced context features, compression efficiency is improved.

Figure 4:
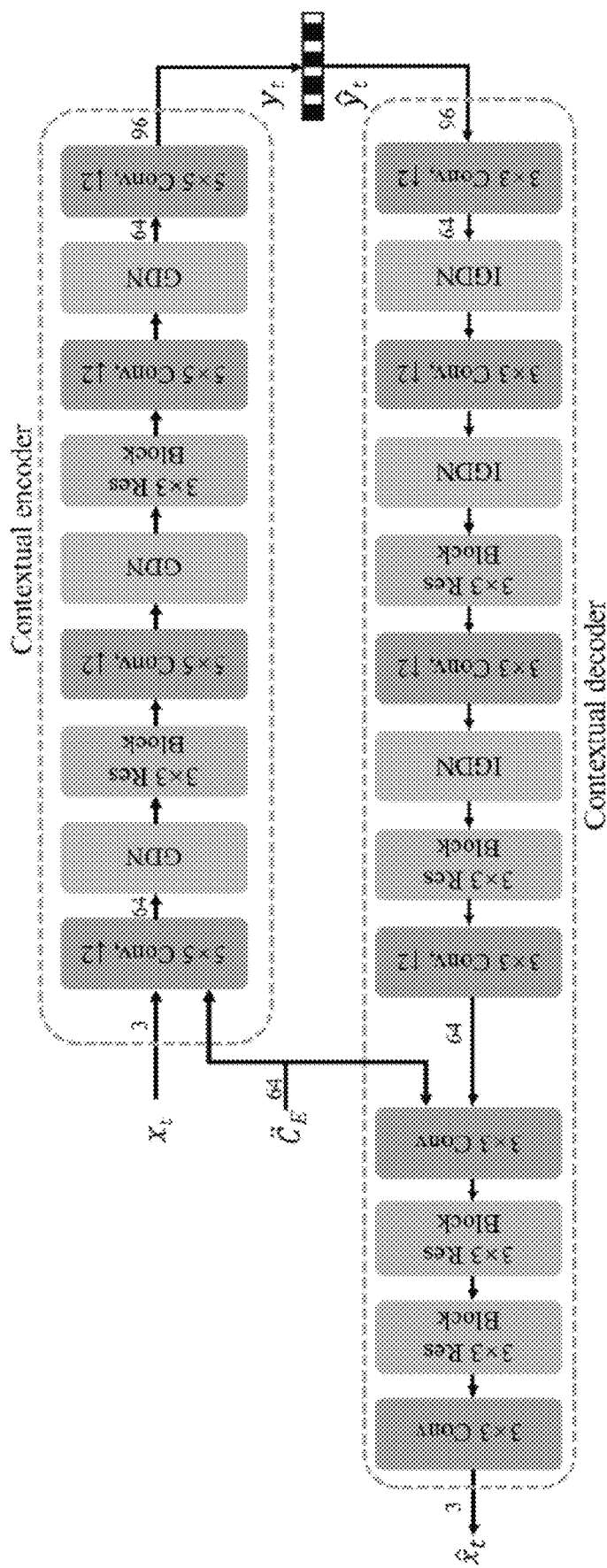
FIG. 4 shows an example architecture of contextual encoder and decoder according to an embodiment of the invention.
Figure 5:
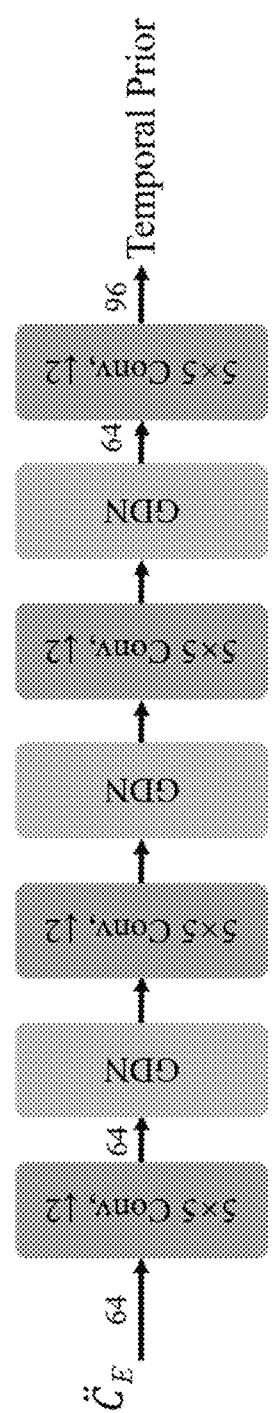
FIG. 5 shows an example architecture of context temporal encoder according to an embodiment of the invention.
Figure 6:
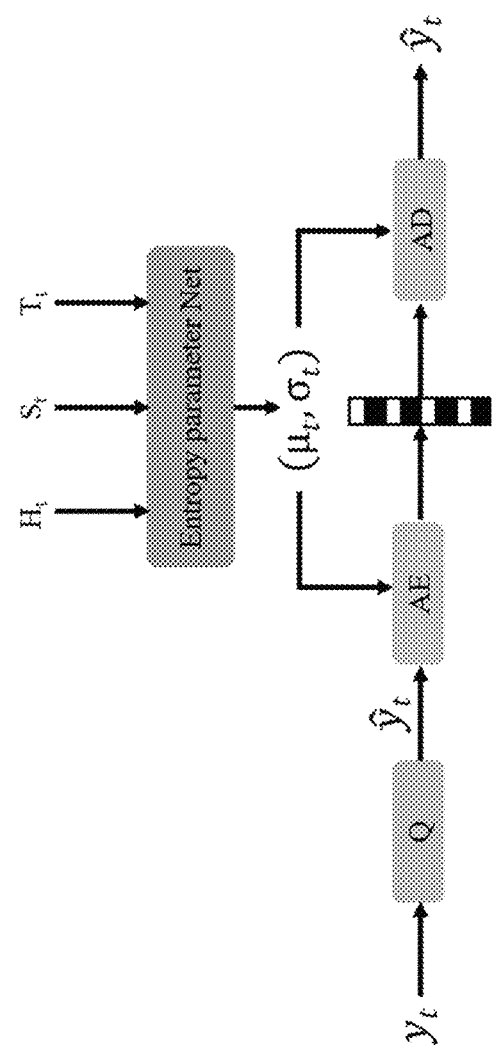
FIG. 6 shows an example architecture of entropy model according to an embodiment of the invention.

FIG. 4 shows the details of re-fill context into contextual encoder and decoder in one embodiment. GDN is generalized division normalization and IGDN is the inverse GDN. The numbers are the channel dimensions. The input frame $x_t$ and enhanced context $\ddot{C}_E$ are concatenated together first. Then they are fed into the contextual encoder to obtain the latent code y, for the entropy model. Symmetric with the encoder, the contextual decoder transforms the latent code back to pixel space with the assistance of enhanced context $\ddot{C}_E$. In such a way, the reconstructed frame $\hat{x}'_t$ is obtained. To reduce the temporal correlation among the latent coder, enhanced context $\ddot{C}_E$ is utilized to generate temporal prior, as shown in FIG. 5. In FIG. 5, the numbers are the channel dimensions. Moreover, FIG. 6 presents the architecture of the entropy model in one embodiment. $H_t$ is the hyper prior, $S_t$ is the spatial prior, and $T_t$ is the temporal prior. Q means quantization. AE and AD are the arithmetic encoder and decoder.

Some embodiments of the invention follow DCVC [15] to assume the distribution of latent y, follows the Laplace distribution. The temporal prior $T_t$ is fused with hyper prior $H_t$[27], and spatial prior $S_t$ [28] to estimate the means and variance for latent $\hat{y}_t$. Moreover, the arithmetic coder is implemented to write and read bitstream. Meanwhile, the MV latent codes also have a corresponding entropy model. The spatial and hyperprior priors are applied for MV latent codes according to an embodiment as DCVC.

Figure 7:
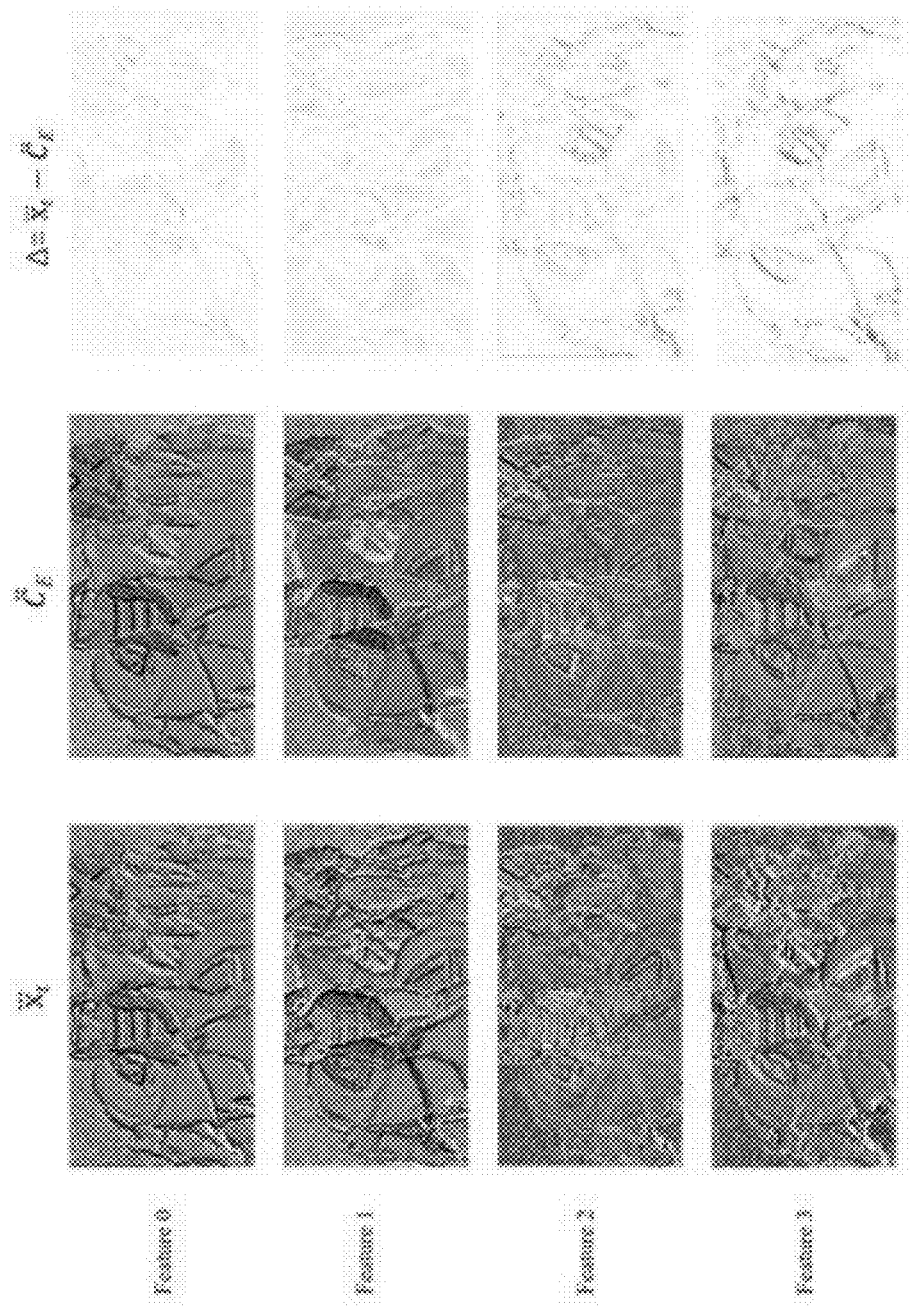
FIG. 7 shows an example visualization of the context x, and enhanced context $\ddot{C}_E$ according to an embodiment of the invention.

FIG. 7 is the visualization of the first four corresponding channels of the context $\ddot{x}_t$ and enhanced context $\ddot{C}_E$. Their difference A is obtained based on the subtraction between $\ddot{x}_t$ and $\ddot{C}_E$. In addition, the differences between $\ddot{x}_t$ and $\ddot{C}_E$ are calculated and presented in FIG. 7, which are removed with the proposed enhanced context model.

C. Post Enhancement Backend Network

Figure 8:
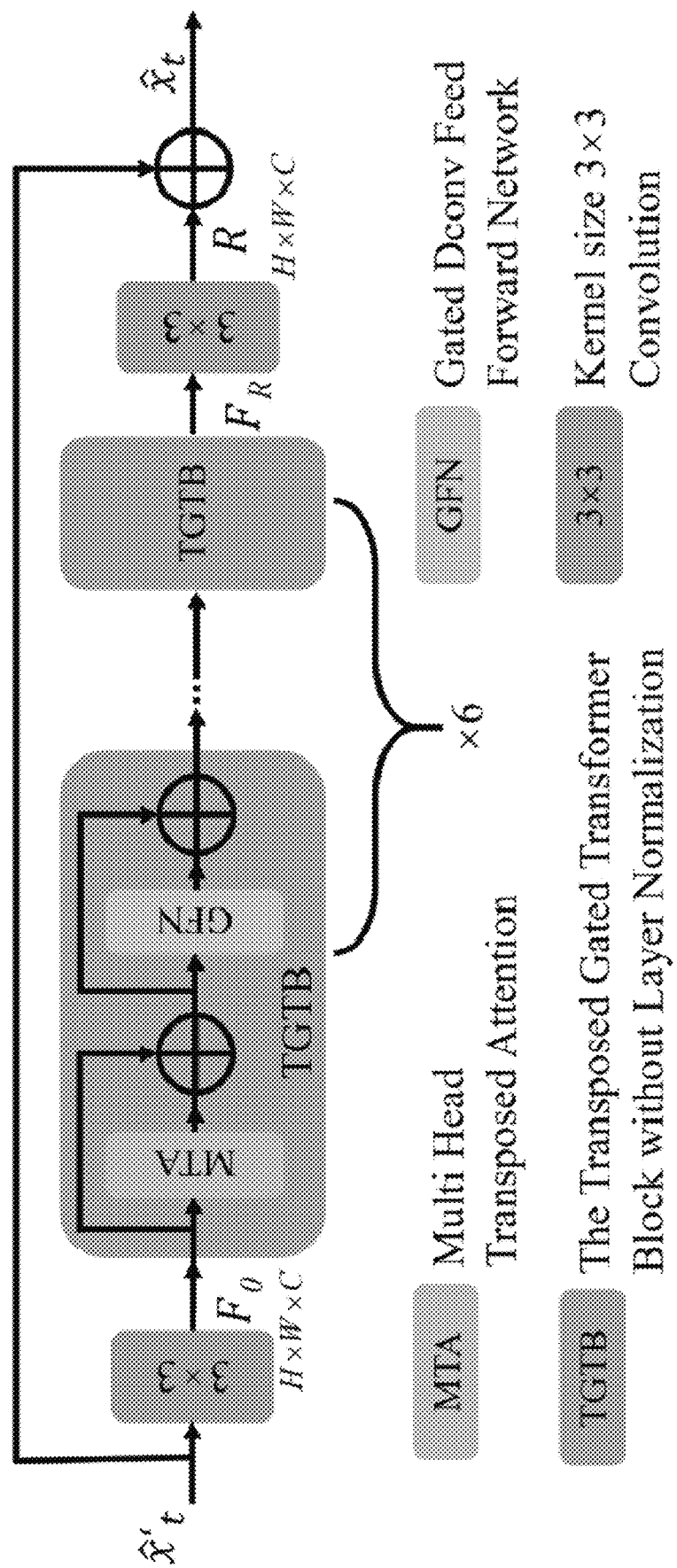
FIG. 8 shows an example architecture of transformer-based post-enhancement backend network according to an embodiment of the invention.

Inspired by the success of transformer in natural languages [19], [20] and vision problems [21]-[23], to capture long range pixel interactions for further performance improvement, a post-enhancement backend network, which is a transformer-based network, is proposed. In the transformer, self-attention's complexity grows quadratically with the spatial resolution of the input frame. Taking an image of H×W pixels as an example, the complexity of key-query dot product interaction is $\mathcal{O}(W^2H^2)$. Therefore, some embodiments of the invention propose the transposed gated transformer block (TGTB) to capture long-range pixel interactions and make the transformer and whole framework feasible for the high-resolution frame simultaneously. The proposed post-enhancement backend network in one embodiment is shown in FIG. 8. In this embodiment the post-enhancement backend network includes six transposed gated transformer blocks and two convolution layers.

Full Resolution Pipeline (FRP):

Down-sampling and up-sampling are often used for transformer-based architecture. These operations can reduce the network parameters and accelerate the training process. Meanwhile, the larger receptive for global feature extraction can be obtained with down-sampling. However, information may be lost during the down-sampling process while the artifact will be inevitably added with up-sampling. Therefore, a full-resolution pipeline can be used for the transformer based post-enhancement backend network.

Given a reconstructed frame $\hat{x}'_t \in \mathbb{R}^{H \times W \times 3}$, a convolution layer is applied first to obtain the low-level feature embedding $F_0 \in \mathbb{R}^{H \times W \times C}$, where H×W is the spatial height and width, and C denotes the channel numbers. Then the feature $F_0$ is passed through six transformer blocks to obtain the refined feature $F_R$. Finally, a convolution layer is applied to FR to obtain residual image $R \in \mathbb{R}^{H \times W \times 3}$ to which the reconstructed frame $\hat{x}'_t$ is added to obtain $\hat{x}'_t$: $\hat{x}_t = \hat{x}'_t + R$. The ablation study demonstrates that adding up-down sampling operations in the pipeline will clearly decline compression performance, which verifies the benefit of the proposed full resolution pipeline.

Transposed Gated Transformer Block (TGTB):

The transposed gated transformer block (TGTB) is designed without layer normalization as the basic unit of post enhancement network, which includes a multi-head transposed attention (MTA) and a gated feed-forward network (GFN). The details of TGTB are as follows.

With Layer Normalization or Not?

First, the normalization layer of the transformer block is removed to prevent performance degradation for the learning based video compression task. Layer normalization is usually applied to normalize the intermediate layers' distributions in the transformer, enabling faster model convergence by losing unimportant information [63]. However, it is pointed out that different tasks prefer different normalization methods in [64] and inappropriate normalization methods may lead to performance degradation. Since the transformed based enhancement network is incorporated into the whole compression framework and train all modules end-to-end, the unimportant information lost by layer normalization may be restored by other modules. In such a way, the whole framework is fooled with losing unimportant information by normalization and restoring information by other modules simultaneously, which leads to performance degradation. Therefore, the transformer block is designed to be without layer normalization in this embodiment. The influence of layer normalization is demonstrated in the ablation study, which verifies the benefit of removing the normalization layer.

MTA and GFN

Figure 9:
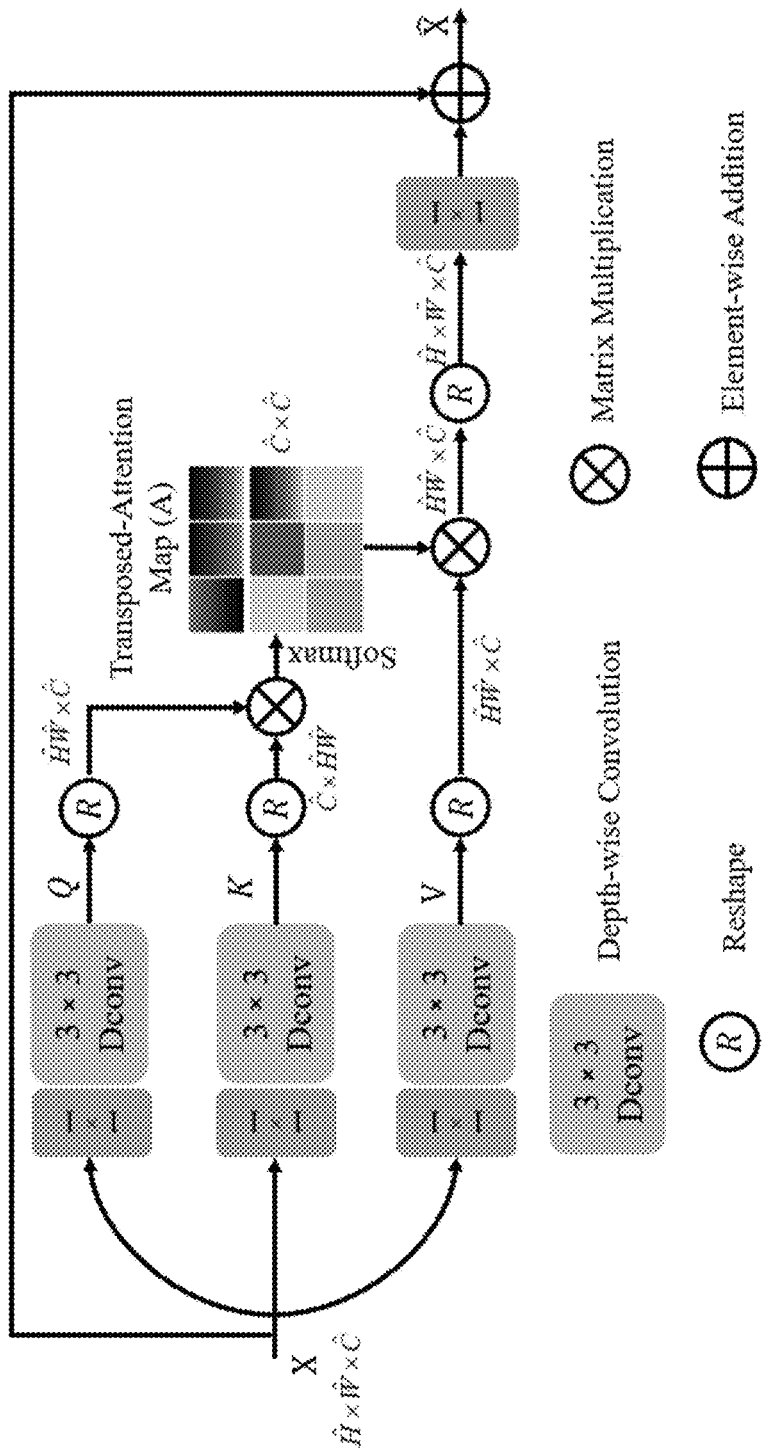
FIG. 9 shows an example architecture of Multi Head Transposed Attention according to an embodiment of the invention.

Second, as mentioned, the major computation overhead of the transformer comes from the self-attention layer of the transformer. In one embodiment, the multi-head transposed attention (MTA) is applied to alleviate the computation problem, as shown in FIG. 9. In this embodiment the key is calculating self-attention across channels rather than the spatial dimension. A transposed attention map for global context encoding is generated by computing cross covariance across channels. Moreover, depth-wise convolution is applied to emphasize the local context before computing feature covariance.

From a feature input $X \in \mathbb{R}^{H \times W \times C}$, the MTA generates query (Q), key (K) and value (V) projections with the local context. Specifically, 1×1 convolution aggregates pixel-wise-cross-channel context and 3×3 depth-wise convolution encodes the channel-wise spatial context. Next, the query (Q) is reshaped to $\hat{H}\hat{W} \times \hat{C}$, and key (K) is reshaped to $\hat{C} \times \hat{H}\hat{W}$. Therefore, the dot-product interaction of query and key is a transposed attention map of size $\mathbb{R}^{\hat{C} \times \hat{C}}$, instead of the attention map size of $\mathbb{R}^{\hat{H}\hat{W} \times \hat{H}\hat{W}}$. In general, the whole process of MTA could be defined as follows:

$$\hat{X} = W_p \text{ Attention}(\hat{Q}, \hat{K}, \hat{V}) + X \tag{5}$$

$$\text{Attention}(\hat{Q}, \hat{K}, \hat{V}) = \hat{V} \cdot \text{Softmax}(\hat{K} \cdot \hat{Q}/\alpha) \tag{6}$$

$$\hat{Q} = \text{Reshape}(W_d^Q W_p^Q X) \text{ where } \hat{Q} \in \mathbb{R}^{\hat{H}\hat{W} \times \hat{C}} \tag{7}$$

$$\hat{K} = \text{Reshape}(W_d^K W_p^K X) \text{ where } \hat{K} \in \mathbb{R}^{\hat{C} \times \hat{H}\hat{W}} \tag{8}$$

$$\hat{V} = \text{Reshape}(W_d^V W_p^V X) \text{ where } \hat{V} \in \mathbb{R}^{\hat{H}\hat{W} \times \hat{C}} \tag{9}$$

where X and $\hat{X}$ are the input and output feature maps. $W_p^{(\cdot)}$ is the 1×1 point-wise convolution and $W_d^{(\cdot)}$ represents the 3×3 depth-wise convolution. $W_p^{(\cdot)}$ and $W_d^{(\cdot)}$ are bias-free convolutions. $\hat{Q}, \hat{K}, \hat{V}$ are obtained after reshaping from the original $\mathbb{R}^{H \times W \times C}$. $\alpha$ is a learnable parameter to control the magnitude of $\hat{K} \cdot \hat{Q}$ before applying softmax. Similar to the multi-head self-attention [6], the number of channels is divided into heads to learn separate attention maps in parallel.

Figure 10:
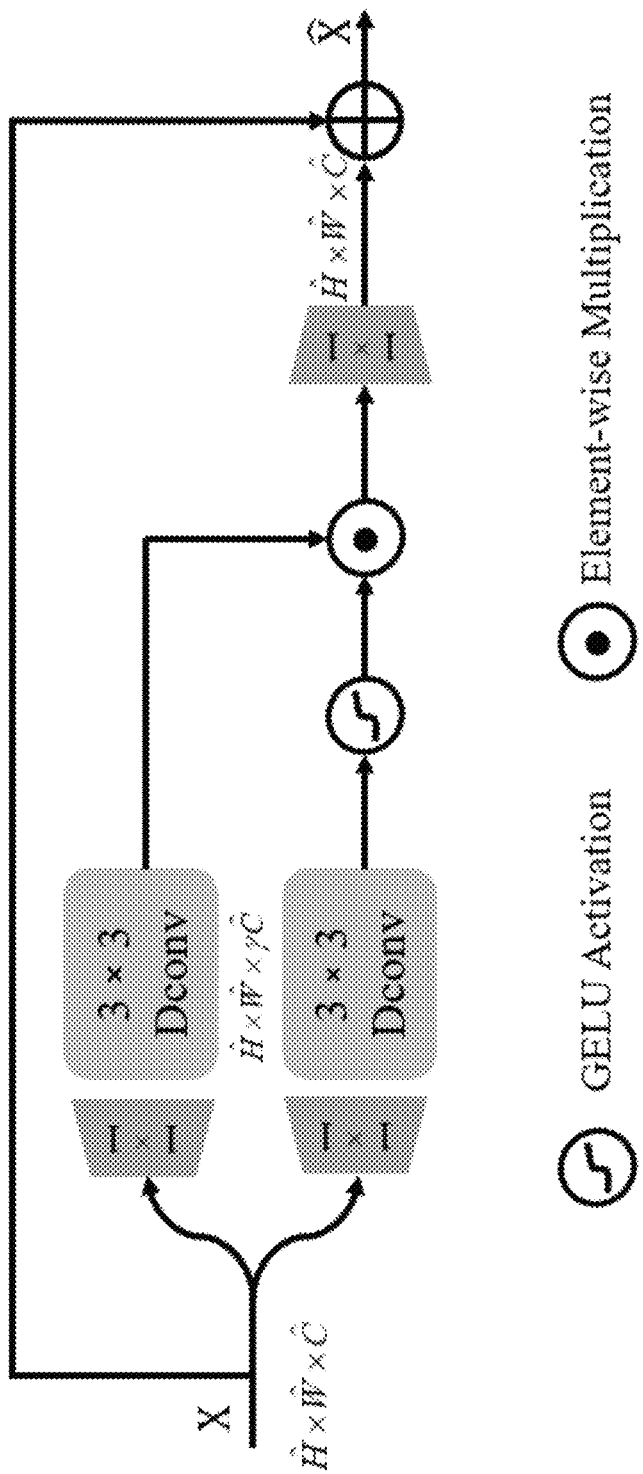
FIG. 10 shows an example architecture of Gated Feed-Forward Network according to an embodiment of the invention.

In addition, the gated feed-forward network is applied with a gating mechanism and depth-wise convolutions as FIG. 10 shows. The gating mechanism is achieved as the element-wise product of two parallel paths of transformation layers, one of which is activated with the GELU non-linearity [65]. The depth-wise convolution is applied to obtain information from spatially neighboring pixel positions. The whole process of GFN is formulated as follows:

$$\hat{X} = W_p^0 \text{ Gating }(X) + X, \tag{10}$$

$$\text{Gating }(X) = \phi(W_d^1 W_p^1((X))) \odot W_d^2 W_p^2((X)), \tag{11}$$

where X and $\hat{X} \in \mathbb{R}^{\hat{H} \times \hat{W} \times \hat{C}}$. $\odot$ represents the element-wise multiplication. $\phi$ denotes the gating function. $W_p^{(\cdot)}$ is the 1×1 point-wise convolution and $W_d^{(\cdot)}$ represents the 3×3 depth-wise convolution, which are bias-free convolutions.

D. Loss Function

The loss function is targeted to optimize the whole framework with the rate distortion (R-D) cost. The loss function is defined as:

$$L = \lambda D + R = \lambda d(x, \hat{x}) + R^{\hat{v}} + R^{\hat{f}} \tag{12}$$

where $d(x, \hat{x})$ is the distortion between the input frame x and the reconstructed frame $\hat{x}$. Mean square error (MSE) or multi-scale structural similarity (MSSSIM) is used to evaluate the distortion. $R^{\hat{v}}$ is the consumed bit number of encoding quantized motion vector latent and corresponding priors. $R^{\hat{f}}$ denotes the consumed bit number of encoding quantized contextual latent and corresponding priors. The expected $R^{(*)}$ is given by the cross-entropy between the marginal and estimated distribution of the latent codes [67]. Moreover, $\lambda$ controls the trade-off between rate R and distortion D.

Experimental Results and Analysis

A. Implementation Details

Training dataset: According to an embodiment, Vimeo-90k is the training data, which has been commonly applied for learning based video compression tasks. The dataset consists of 91,701 sequences with a fixed resolution of 448×256, each containing seven frames. The video sequences are randomly cropped to 256×256 patches.

Testing dataset: The testing dataset includes HEVC standard sequences from the common test conditions used by the standard community. To be specific, ClassB (1920×1080 resolution), Class C (832×480 resolution), Class D (416× 240 resolution), and Class E (1280×720 resolution) are used to evaluated performance. Test is not performed on HEVC ClassA sequences (2560×1600 resolution) as previous learning-based codecs do not evaluate on ClassA sequences [13], [15], [42]. Moreover, 1920×1080 resolution videos from UVG and MCL-JCV [71] datasets are also tested. Overall, the compression performance is measured with sixteen HEVC sequences, seven UVG sequences and thirty MCL-JCV sequences, including slow/fast motion, homogeneous/non-homogeneous scene, object rotation, complex texture, etc.

Implementation details: The example models are implemented on NVIDIA 3090 GPUs with PyTorch [72] and CompressAI [73] project. For comparison, this example follows DCVC and trains four models with different $\lambda$ values (In terms of PSNR, $\lambda$ equals to 256, 512, 1024, 2048; In terms of MS-SSIM, A equals to 8, 16, 32, 64.). The AdamW [74] optimizer is used with the initial learning rate of 1e-4, and the batch size is set to 8.

Testing configuration settings: Following the settings in [15], the group of pictures (GOP) is set as 10 for HEVC sequences and 12 for others. In addition, this example tests 100 frames for HEVC sequences and 120 frames for others.

Because this disclosure focuses on inter-frame coding, existing learning-based image compression models in CompressAI project [73] is used for intra-frame coding. In this example, cheng2020-anchor [12] is utilized for the PSNR target and hyperprior [27] is utilized for MS-SSIM target in the proposed DEVC embodiment and DCVC. The quality levels of cheng2020-anchor and hyperprior are set as 3, 4, 5 and 6 respectively for different bit-rate coding scenarios, where the larger level value means better frame quality corresponding to larger λ in learning-based inter-frame coding.

B. Performance Evaluation

The proposed DEVC method embodiment is compared with existing codecs, e.g., H.264 [1], H.265 [54] and VVC [3] to demonstrate the coding efficiency. One embodiment applies the x265 very slow profile and x264 very fast profile in FFmpeg for H.265 and H.264 as follows.

ffmpeg -y pix_fmt yuv420p -s W×H -r FR -i input.yuv -vframes N -c:v libx265 -tune zerolatency -preset verys- low -x265-params "crf=QP:keint=GOP:verbose=1" output.mkv ffmpeg -y pix_fmt yuv420p -s W×H -r FR -i input.yuv - vframes N -c:v libx264-tune zerolatency -preset very-fast -crf QP -g GOP -sc_threshold 0 output.mkv where W, H, FR, N, QP, and GOP represent the height, width, frame rate, the number of encoded frames, quantization parameter and a group of pictures. The internal color space is YUV420, and QP is set to 15, 19, 23 and 27 for different bit-rate coding. It is worth mentioning that the testing configuration settings for H.264 and H.265 are not changed. GOP is set as 10 for HEVC sequences and is set as 12 for others, and 100 frames are tested for HEVC and 120 frames are tested for others. Moreover, W, H and FR are configured according to the property of the test sequence.

Regarding VVC, VTM-14.0 is considered a competitive baseline to compress the testing dataset. Because the GOP size of VTM with encoder low-delay vtm configuration is 8, it only supports intra-period as multiples of 8. Meanwhile, the proposed method is a predictive coding framework. Therefore, the intraperoid is set to 16 and predictive configuration lowdely_p_vtm.cfg is selected as the default configuration file of VVC for performance comparison.

EncoderAppStatic -c encoder_lowdelay_P_vtm.cfg - - InputFile=input.yuv - -BitstreamFile=rec.bin - -Decoding RefreshType=2 - -InputBitDepth=8 - -OutputBitDepth=8 - - OutputBitDepthC=8 - -FrameRate=FR - -FramesToBe Encoded=N - -SourceWidth=W - -SourceHeight=H - -IntraPeriod=16 - -QP=QP - -Level=6.2 - -ReconFile=rec.yuv where W, H, FR, N, and QP are the height, width, frame rate, number of encoded frames, and quantization parameter respectively. QP is set as 22, 25, 28, and 31 for VVC. In addition, 100 frames are tested for HEVC and 120 frames are tested for other sequences.

Since the neural network is trained and performs on the RGB domain for vision tasks, RGB format is employed for some existing learning-based video compression works. This example also evaluates frame quality (PSNR or MS-SSIM) in the RGB domain. For H.264, H.265 and VVC, the yuv file is transformed to a png format image and the corresponding frame quality is calculated.

At the same time, representative learning based video coding methods are selected as baselines, these methods include: DVC [13], FVC [42], DCVC [15]. DVC is the first end-to-end predictive coding framework that pioneered learning-based video compression. FVC has shifted the pixel space framework to the feature space video compression framework. DCVC has enabled a conditional coding framework, which takes the high dimension context as a condition to guide compression rather than calculate the residual between the predicted and input frames. In general, the DVC, FVC and DCVC have made great improvements in learning-based video compression, which are considered representative learning-based methods with SOTA performance.

In addition, Li et al. proposes DCVC [15] in and further improves DCVC with a hybrid spatial-temporal entropy modeling and a content-adaptive quantization mechanism [49], which shows comparable performance with VVC. In [49], decoded frame and the feature before obtaining the reconstructed frame for temporal context mining are propagated for inter-frame prediction. On the contrary, only decoded frame is propagated with the method in one embodiment. The proposed method could be treated as another way to improve compression efficiency and extensible to other learning-based methods on top of conditional coding. Moreover, Lin et al. proposes multiple frame prediction to generate and propagate multiple MV fields in [50]. Learning-based multi-reference frameworks [52], [53] are also proposed for video compression. In this example, considering the fair comparison with only one decoded frame to be propagated for reference, only the performance comparisons among the proposed DEVC embodiment and VVC, DVC, FVC, DCVC, H.265, H.264 are shown.

Figure 11:
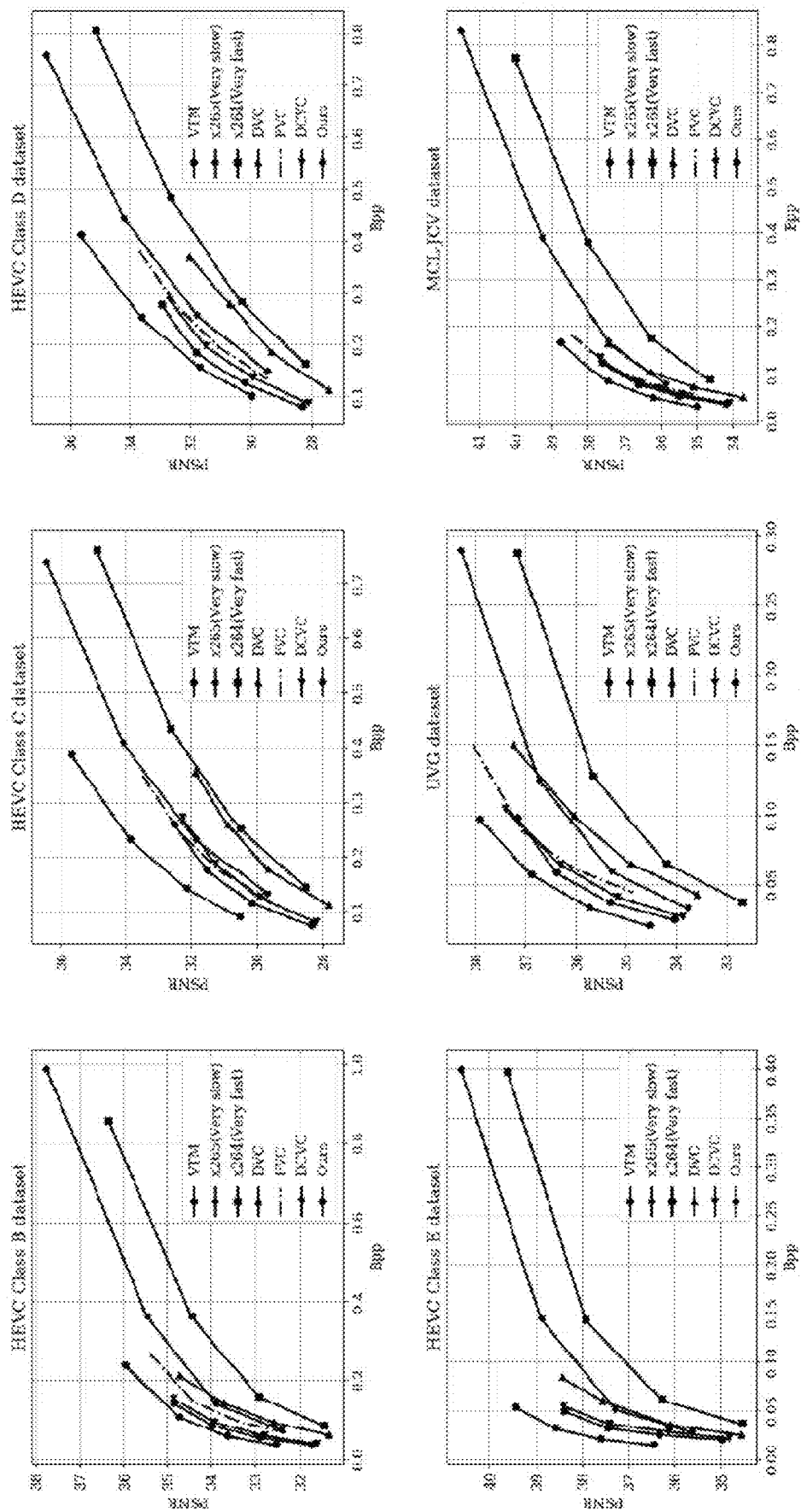
FIG. 11 shows coding performance comparison of the proposed method embodiment evaluation on PSNR metric.

PSNR Metric Evaluation:

The BD-Rate [75] is applied to measure the performance of the proposed method (DEVC) and other state-of-art methods. The x265 very slow profile is taken as the anchor and the BD-Rate comparison is presented in terms of PSNR as shown in TABLE I. The negative numbers indicate bitrate savings, and the best and second-best neural video coding methods are marked as bold in bracket and underlined. Furthermore, bits per pixel (bpp) is taken as the horizontal axis and reconstructed PSNR is taken as the vertical axis to visualize the coding performance curves as shown in FIG. 11. The bpp and PSNR are averaged in each class.

The proposed DEVC embodiment achieves a significant performance gap compared with previous conventional video codecs, H.264 and H.265, which shows the tremendous potential of learning based methods. The DEVC outperforms H.265 by 36.40% average bit savings on all testing datasets, especially up to 46.33% bit savings for UVG sequences and 41.06% bit savings for HEVC Class B sequences. Compared with the VTM LDP configuration, the proposed DEVC embodiment is inferior in terms of BD rate for PSNR, which can be further explained as follows. The proposed DEVC embodiment only applies one reference frame and flat QP for inter-prediction. However, the LDP configuration in VTM denotes a better configuration using multiple references and dynamic QP. Meanwhile, there are fewer I frame in VTM testing as the setting of the intra period is 16 rather than 10/12, and 100 frames are tested for HEVC sequences and 120 frames are tested for other sequences.

As can be observed from the experimental results, the proposed DEVC embodiment outperforms the listed end-to-end video codecs on all testing datasets, which demonstrates a strong generalization ability as the testing datasets contain different characteristics. In TABLE II, the DCVC is taken as the anchor to show the performance improvement with a double enhanced modeling scheme in one embodiment. A 9.85% bit rate reductions on average in terms of PSNR can be achieved with the proposed method.

Figure 12:
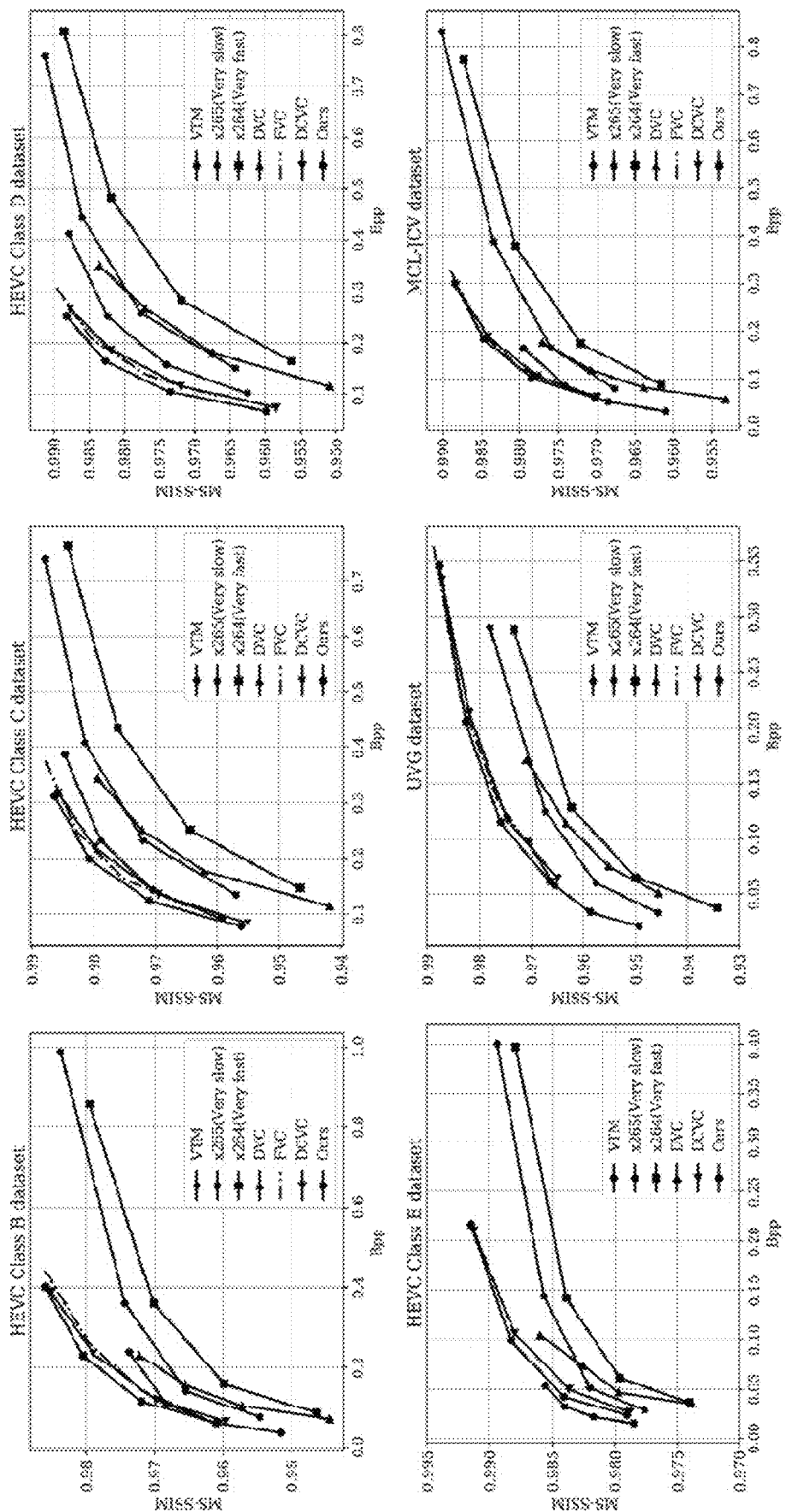
FIG. 12 shows coding performance comparison of the proposed method embodiment evaluation on MS-SSIM metric.
Figure 14A:
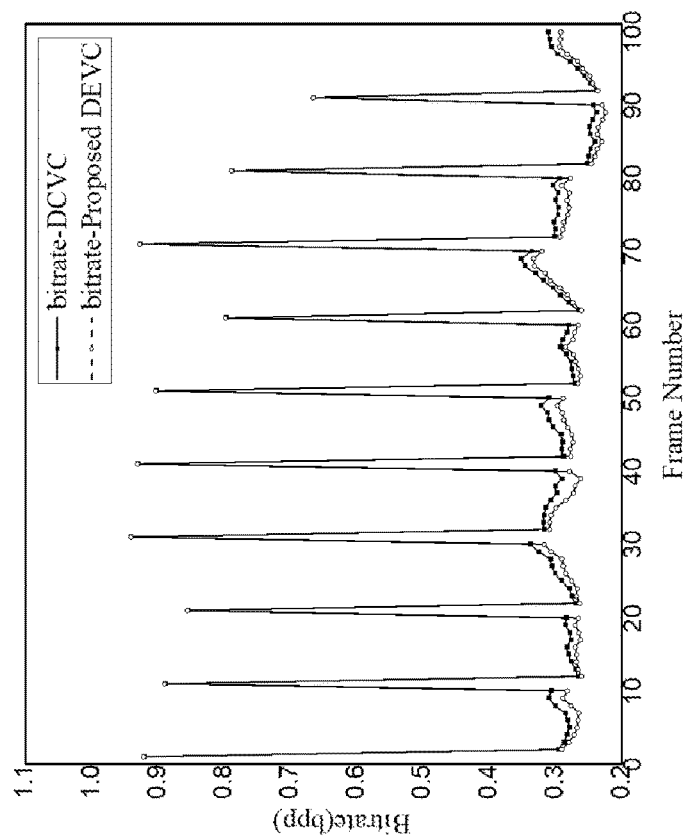
FIG. 14A shows PSNR and bitrate comparisons between DCVC and the DEVC embodiment ($\lambda$=2048).
Figure 14A:
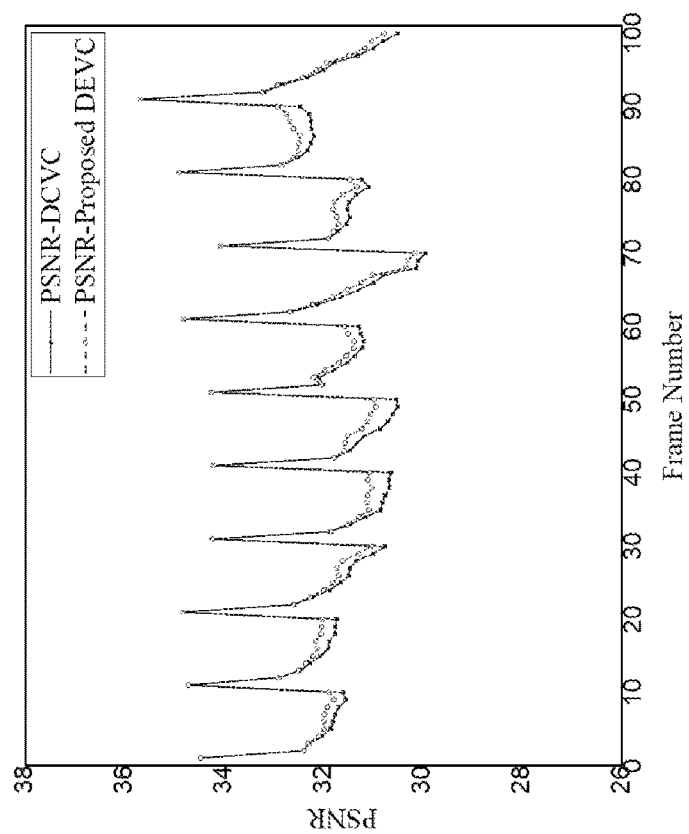
Figure 14B:
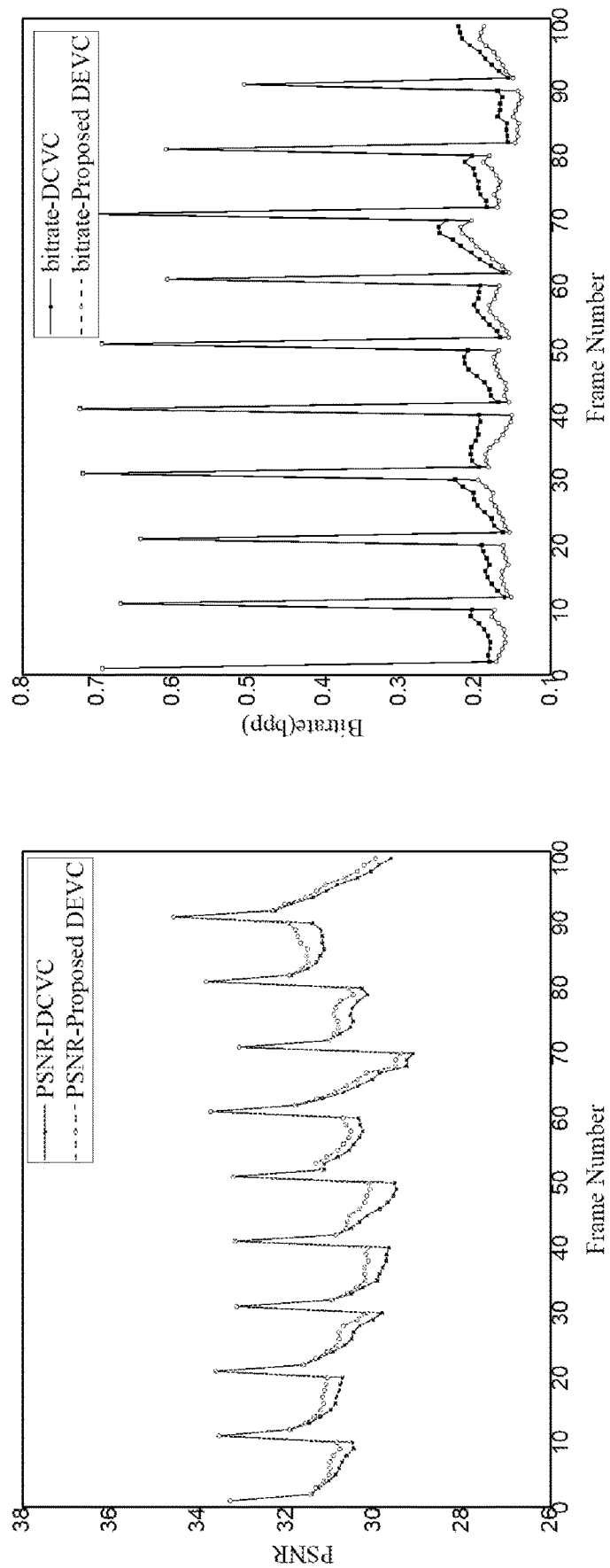
FIG. 14B shows PSNR and bitrate comparisons between DCVC and the DEVC embodiment ($\lambda$=1024).
Figure 14C:
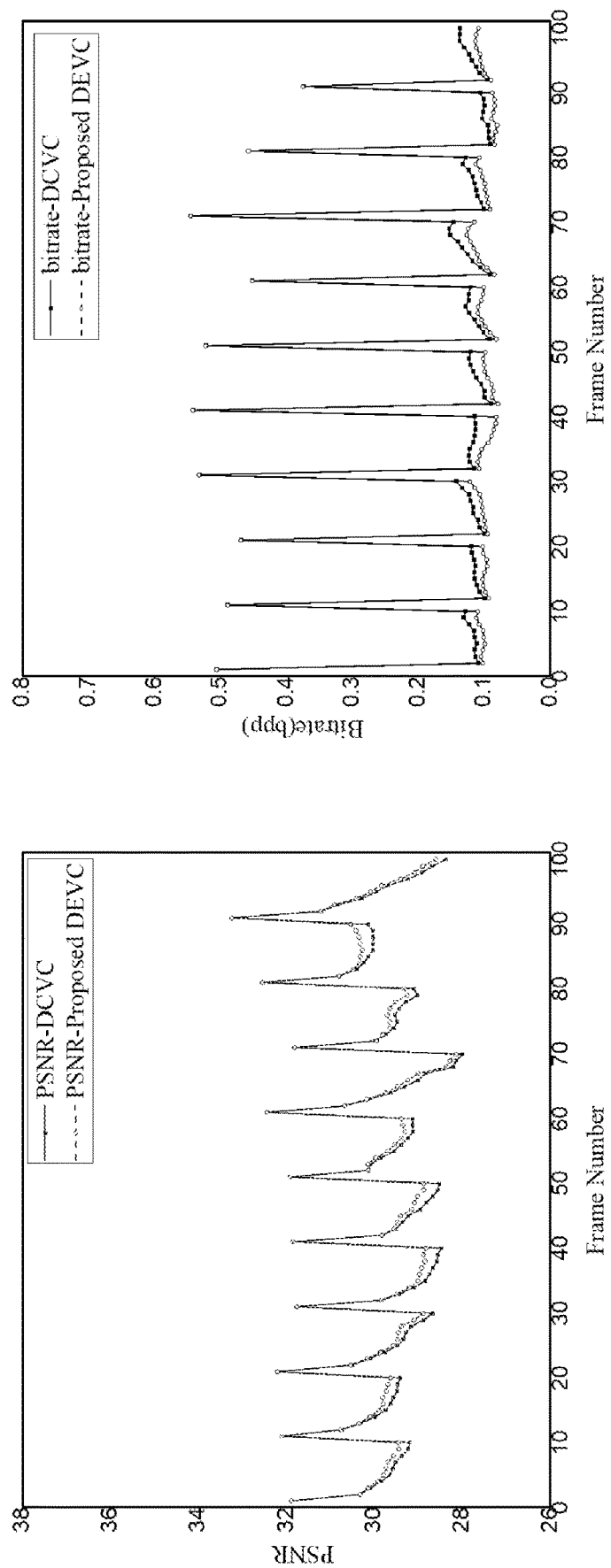
FIG. 14C shows PSNR and bitrate comparisons between DCVC and the DEVC embodiment ($\lambda$=512).
Figure 14D:
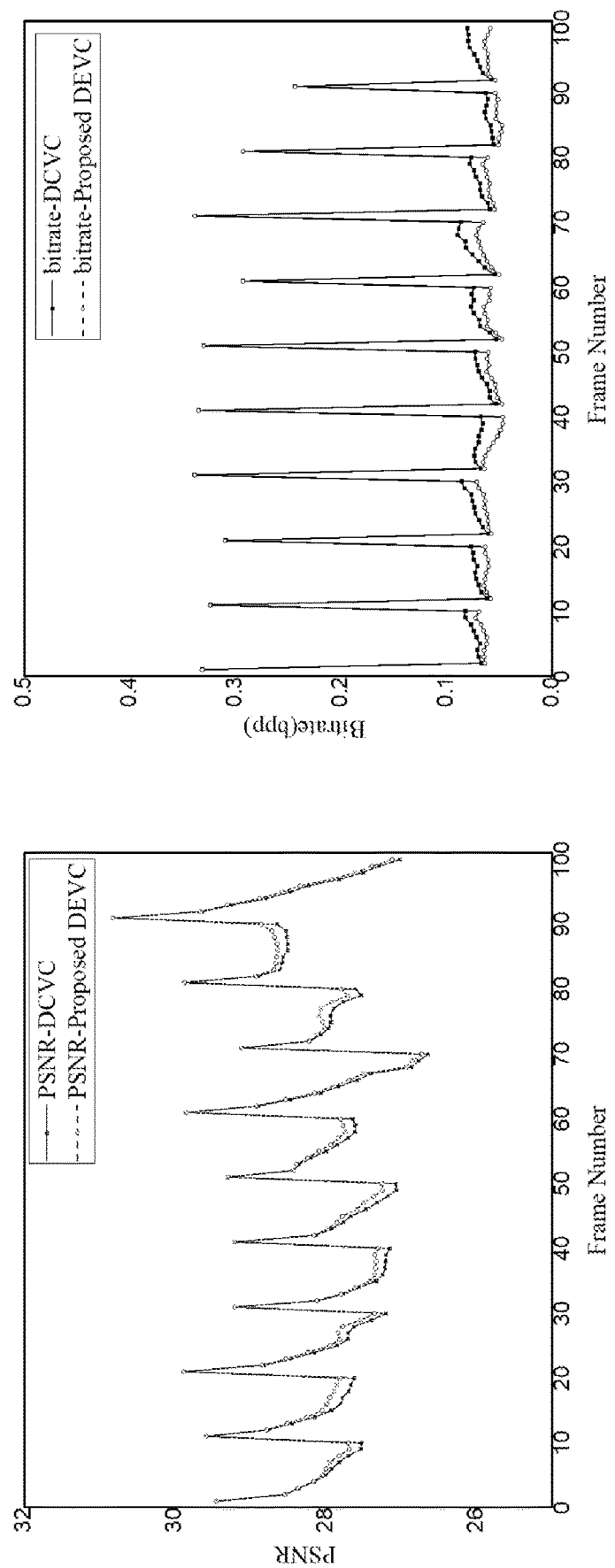
FIG. 14D shows PSNR and bitrate comparisons between DCVC and the DEVC embodiment ($\lambda$=256).

MS-SSIM Metric Evaluation:

The distortion metric is shifted from PSNR to MS-SSIM and the BD-Rate comparison is presented. The average of bpp and MS-SSIM are calculated for each test dataset class and the RD curves are drawn, as shown in FIG. 12. In FIG. 12, the bpp and MS-SSIM are averaged in each class. The detailed performance results can be found in TABLE III. Compared with H.265, the DEVC embodiment shows an average 52.85% RD performance improvement in terms of MS-SSIM. Furthermore, it outperforms the latest traditional codec VVC with around 6.7% bit savings. Meanwhile, the DEVC embodiment is better than other listed learning-based codecs. Taking the DCVC as the anchor in TABLE II, it can be seen that a 12.19% RD performance improvement is obtained with the proposed method.

TABLE I
THE BD-RATE COMPARISON IN TERMS OF PSNR (INTRA PERIOD 10/12)

| Method | Class B | Class C | Class D | Class E | UVG | MCL-JCV | Average |
|---|---|---|---|---|---|---|---|
| X264 (very fast) | 77.60% | 56.22% | 51.62% | 82.61% | 74.32% | 73.97% | 71.82% |
| VTM (LDP) | −54.32% | −41.86% | −35.77% | −67.92% | −55.42% | −54.60% | −53.06% |
| DVC [13] | 9.01% | 42.70% | 43.70% | 10.36% | 34.23% | 6.36% | 16.08% |
| FVC [42] | −17.35% | −7.26% | −8.64% | — | −31.66% | −26.12% | — |
| DCVC [15] | −34.08% | −5.44% | −16.19% | −27.21% | −31.80% | −32.46% | −28.96% |
| Ours(DEVC) | (−41.06%) | (−17.58%) | (−27.40%) | (−35.90%) | (−46.33%) | (−37.07%) | (−36.40%) |

The anchor is x265 very slow, and negative numbers indicate bitrate savings.
We mark the best and second-best neural video coding methods as bold in bracket and underlined.

TABLE II
THE BD-RATE COMPARISON BETWEEN DEVC AND DCVC IN TERMS OF PSNR AND MS-SSIM (INTRA PERIOD 10/12)

| Method | BD-Rate (PSNR) | BD-Rate (MS-SSIM) |
|---|---|---|
| Class B | −10.60% | −13.93% |
| Class C | −13.09% | −13.45% |
| Class D | −13.41% | −15.50% |
| Class E | −12.32% | −15.81% |
| UVG | −13.16% | −14.20% |
| MCL-JCV | −7.81% | −10.46% |
| AVERAGE | −9.85% | −12.19% |

The anchor is DCVC.
Negative numbers indicate bitrate savings.

Subjective Quality Comparisons:

Regarding the subjective quality comparison, frames from RaceHorses, Cactus, and BQSquare are selected and local regions are enlarged for better visualization in FIG. 13. As shown in FIG. 13, the proposed DEVC embodiment retains more details with a higher-fidelity texture than DCVC.

C. Complexity Analysis

The model complexity in the model size of parameters number, MACs (multiply-accumulate operations) and encoding-decoding time cost are compared. The 480p resolution sequences of HEVC Class C are involved in complexity analyses. Moreover, complexity analysis is conducted on machine computer with NVIDIA 3090 GPU and Intel® Xeon® Silver 4210 CPU @ 2.20 GHz. The complexity comparison result is shown in TABLE IV. For the time cost of one frame encoding and decoding, The codec time including the time writing to and reading from a bitstream is measured. As the time to encode and decode one frame would be influenced by the frame's content and the status of the computer, the 95% confidence time costing interval for DCVC and DEVC are calculated.

TABLE III
THE BD-RATE COMPARISON IN TERMS OF MS-SSIM (INTRA PERIOD 10/12)

| Method | Class B | Class C | Class D | Class E | UVG | MCL-JCV | Average |
|---|---|---|---|---|---|---|---|
| X264 (very fast) | 60.92% | 51.19% | 41.10% | 65.88% | 59.95% | 58.19% | 57.17% |
| VTM (LDP) | −45.99% | −35.91% | −30.44% | −58.09% | −48.88% | −47.87% | −46.19% |
| DVC [13] | 9.63% | 11.73% | 11.72% | 17.02% | 58.72% | 16.91% | 20.97% |
| FVC [42] | −46.95% | −38.39% | −45.76% | — | −49.12% | −46.80% | — |
| DCVC [15] | −49.76% | −35.35% | −40.80% | −41.52% | −38.72% | −49.25% | −45.73% |
| Ours(DEVC) | (−57.90%) | (−44.34%) | (−49.83%) | (−52.05%) | (−50.04%) | (−54.28%) | (−52.85%) |

The anchor is x265 very slow, and negative numbers indicate bitrate savings.
We mark the best and second-best neural video coding methods as bold in bracket and underlined.

TABLE IV
THE COMPLEXITY COMPARISON OF OURS(DEVC) AND DCVC

| | DCVC | Ours(DEVC) | δ (%) |
|---|---|---|---|
| Model size (M) | 7.94 | 8.5 | — |
| MACs (G) | 429.93 | 635.72 | — |
| Time cost (s) | 11.819 ± 0.213 | 12.069 ± 0.126 | 2.12% |

480p resolution sequences of HEVC class C are used for test.

Moreover, define δ as follows:

$$\delta = \frac{T_{DEVC} - T_{DCVC}}{T_{DCVC}} \times 100\% \quad (13)$$

where $T_{DEVC}$ and $T_{DCVC}$ indicate the total coding time of the proposed DEVC embodiment and DCVC. Compared with DCVC [15], the time cost of the embodiment increased a little, only 2.12%. The parameters number has increased 7.05% from 7.94 M to 8.5 M while the MACs are from 429.93 G to 635.72 G. The reason why the MACs increase greatly can be explained as follows.

TABLE V
THE BD-RATE COMPARISON OF PSNR BETWEEN DEVC AND DCVC DEFAULT GOP VS. GOP = 32

| Method | DEVC vs. DCVC (Default GOP) | DEVC vs. DCVC (GOP = 32) |
|---|---|---|
| Class B | −10.60% | −22.00% |
| Class C | −13.09% | −25.91% |
| Class D | −13.41% | −26.14% |

TABLE V-continued

THE BD-RATE COMPARISON OF PSNR BETWEEN
DEVC AND DCVC DEFAULT GOP VS. GOP = 32

| Method | DEVC vs. DCVC (Default GOP) | DEVC vs. DCVC (GOP = 32) |
|---|---|---|
| Class E | −12.32% | −30.40% |
| UVG | −13.16% | −23.19% |
| MCL-JCV | −7.81% | −15.00% |
| AVERAGE | −9.85% | −19.28% |

The anchor is DCVC default GOP and DCVC GOP = 32.
Negative numbers indicate bitrate savings.

The self-attention structure is used to capture long-distance dependencies well, but it requires a lot of computation. According to an embodiment, transposed gated transformer block (TGTB) is proposed to alleviate the major computation overhead of self-attention and how to reduce the calculation amount further is worth exploring. With the proposed design embodiment, the compression efficiency has improved, with an average of 9.85% and 12.19% for PSNR and MS-SSIM respectively, under default GOP settings. Specifically, a 19.28% improvement for PSNR can be obtained when GOP size is 32, as shown in TABLE V.

D. Ablation Study

Effectiveness of Different Components:

To demonstrate the effectiveness of the enhanced context mining model (ECM) and transformer-based post enhancement backend network (TPEN), the proposed DEVC embodiment is taken as a baseline. The proposed components' influences are presented in TABLE VI. The positive numbers represent the degradation of compression performance. As shown in TABLE VI, using ECM to remove the redundancy across context channels can bring an 11% gain and the post enhancement backend network brings an extra 3% performance gain. It is verified that the proposed ECM can better learn context and the transformer-based post-enhancement network further improve the compression performance.

Ablation Study of Full Resolution Pipeline:

To study the benefit of full-resolution pipeline for TPEN, up-down sampling is added into the pipeline and the performance comparison is demonstrated in TABLE VII. As seen from TABLE VII, adding down/up sampling into the pipeline decline 2.29% compression performance. The experiment result corresponds to the design insight that information may be lost during the down-sampling process while the artifact will be inevitably added with up-sampling, and verifies the benefit of the proposed full-resolution pipeline.

TABLE VI

EFFECTIVENESS OF DIFFERENT
COMPONENTS IN OUR DESIGN

| BCM | TPEN | B | C | D | E | Average |
|---|---|---|---|---|---|---|
| ✓ | ✓ | 0.0% | 0.0% | 0.0% | 0.0% | 0.0% |
| ✓ | X | 3.589% | 3.42% | 3.939% | 2.69% | 3.46% |
| X | ✓ | 9.359% | 12.080% | 13.210% | 6.93% | 11.05% |
| X | X | 11.89 | 15.096% | 15.62% | 14.16% | 14.05% |

The baseline is our final solution DEVC.
Positive numbers represent compression performance degradation.

TABLE VII

ABLATION STUDY OF FULL RESOLUTION PIPELINE

| Method | B | C | D | E | Average |
|---|---|---|---|---|---|
| With FRP | 0.0% | 0.0% | 0.00% | 0.0% | 0.0% |
| With down/upsampling | 1.77% | 1.00% | 1.90% | 5.40% | 2.29% |

The baseline is our final solution DEVC.
Positive numbers represent compression performance degradation.

TABLE VIII

INFLUENCE OF NORMALIZATION LAYER IN TPEN

| | With LN (Bpp/PSNR) | Without LN (Bpp/PSNR) |
|---|---|---|
| $\lambda = 2048$ | 0.38/31.64 | 0.24/31.48 |
| $\lambda = 1024$ | 0.26/30.76 | 0.18/30.80 |
| $\lambda = 512$ | 0.10/19.34 | 0.12/29.45 |
| $\lambda = 256$ | 0.09/20.15 | 0.09/28.58 |

We take BQTerrace sequence as an example.

The Benefit of Removing Normalization Layer in TPEN:

The BQTerrace sequence is taken from HEVC Class B (1920×1080) as an example to present the bpp/PSNR value with layer normalization and without layer normalization in TPEN. The influence of the normalization layer is demonstrated in TABLE. VIII. It can be observed that larger bpp or poor quality is obtained with layer normalization in TPEN. This phenomenon may be explained as follows. Since the transformed-based enhancement network is incorporated into the whole compression framework and all modules are trained end to end, the whole framework is fooled with losing unimportant information by normalization and restoring information by other modules simultaneously, resulting in performance degradation. Therefore, the transformer block without layer normalization is designed.

TABLE IX

ABLATION STUDY OF TRANSPOSED
GATED TRANSFORMER BLOCK

| Method | B | C | D | E | Average |
|---|---|---|---|---|---|
| W/MTA and W/GFN | 0.0% | 0.0% | 0.0% | 0.0% | 0.0% |
| W/O MTA and W/GFN | 1.22% | 1.35% | 1.51% | 0.89% | 1.43% |
| W/MTA and W/O GFN | 2.41% | 2.27% | 2.86% | 4.19% | 2.82% |

Positive numbers represent compression performance degradation.

Ablation Study of Transposed Gated Transformer Block:

The ablation study of transposed gated transformer block is demonstrated in TABLE IX. There is a 1.43% performance degradation without MTA and a 2.82% decline without GFN, which verifies the benefit of MTA and GFN in transposed gated transformer block.

E. Error propagation Analysis

RaceHorses is taken from HEVC Class C as an example to present the PSNR and bitrate comparisons between DCVC and the proposed DEVC embodiment in FIG. 14A to FIG. 14D. It can be observed that the DEVC embodiment has achieved better reconstruction quality with fewer bit costs under all $\lambda$ settings. In conclusion, the DEVC embodiment can efficiently reduce error propagation, and when the GOP size is larger, the advantage of the DEVC embodiment is more pronounced.

Conclusion

According to some embodiments of the invention, a double-enhanced modeling for learned video compression is designed. In particular, a context mining model is designed to reduce redundancy across context channels. The residual learning and convolution operation are applied along with context channels to reduce the introduced artifacts caused by the bilinear warping and inaccurate motion estimation. A transformer-based post-enhancement backend network is also designed to capture the long-distance dependencies. Specifically, it is provided a full-resolution pipeline for the post enhancement network without information damage. Moreover, transposed gated transformer block without normalization is designed to alleviate self-attention computation and make the whole framework feasible for the high-resolution frame.

Extensive experiments show that the proposed embodiment outperforms the VVC with around 6.7% bit savings and surpasses DCVC 12.19% in terms of MS-SSIM. Regarding the PSNR metric, the proposed embodiment exceeds HEVC with an average 36.40% improvement, up to 46.33% bit savings for UVG sequences and 41.06% bit savings for HEVC Class B sequences. Compared with DCVC, the proposed embodiment achieves 9.85% bit savings. Specifically, a 19.28% improvement is obtained for PSNR when GOP is 32. The advantage of the proposed method/framework will be more pronounced when the GOP size increases and the time complexity increment of the proposed model can be neglected.

System

Figure 15:
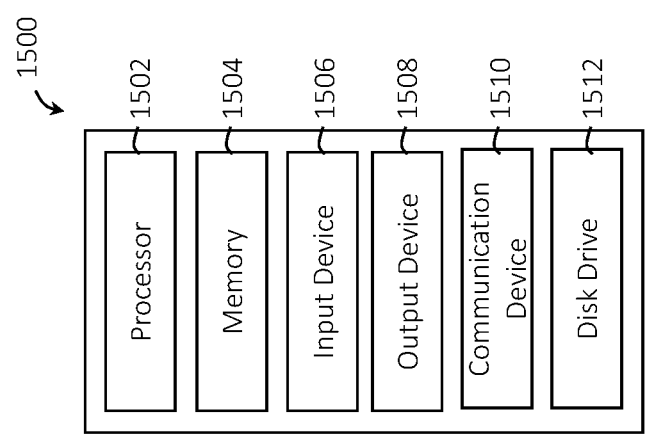
FIG. 15 shows an example information handling system in some embodiments of the invention.

FIG. 15 shows an example information handling system 1500 that can be used to perform one or more of the methods for learned video compression in embodiments of the invention (including the embodiments in FIGS. 2, 3, 4, 5, 6, 8, 9, and 10). The information handling system 1500 generally comprises suitable components necessary to receive, store, and execute appropriate computer instructions, commands, and/or codes. The main components of the information handling system 1500 are a processor 1502 and a memory (storage) 1504. The processor 1502 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), or any other digital or analog circuitry/circuitries configured to interpret and/or to execute program instructions and/or to process signals and/or information and/or data. The memory 1504 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 1504. Computer instructions for executing or facilitating executing the method embodiments of the invention may be stored in the memory 1504. The processor 1502 and memory (storage) 1504 may be integrated or separated (and operably connected). Optionally, the information handling system 1500 further includes one or more input devices 1506. Example of such input device 1506 include: keyboard, mouse, stylus, image scanner, microphone, tactile/touch input device (e.g., touch sensitive screen), image/video input device (e.g., camera), etc. Optionally, the information handling system 1500 further includes one or more output devices 1508. Example of such output device 1508 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The information handling system 1500 may further include one or more disk drives 1512 which may include one or more of: solid state drive, hard disk drive, optical drive, flash drive, magnetic tape drive, etc. A suitable operating system may be installed in the information handling system 1500, e.g., on the disk drive 1512 or in the memory 1504. The memory 1504 and the disk drive 1512 may be operated by the processor 1502. Optionally, the information handling system 1500 also includes a communication device 1510 for establishing one or more communication links (not shown) with one or more other computing devices, such as servers, personal computers, terminals, tablets, phones, watches, IoT devices, or other wireless computing devices. The communication device 1510 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1502, the memory 1504 (optionally the input device(s) 1506, the output device(s) 1508, the communication device(s) 1510 and the disk drive(s) 1512, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the information handling system 1500 shown in FIG. 15 is merely an example and that the information handling system 1500 can in other embodiments have different configurations (e.g., include additional components, has fewer components, etc.).

Although not required, one or more embodiments described with reference to the Figures can be implemented as an application programming interface (API) or as a series of libraries for use by a developer or can be included within another software application, such as a terminal or computer operating system or a portable computing device operating system. In one or more embodiments, as program modules include routines, programs, objects, components, and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by a person skilled in the art that variations and/or modifications may be made to the described and/or illustrated embodiments of the invention to provide other embodiments of the invention. The described/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings).

REFERENCES

[1] T. Wiegand, G. J. Sullivan, G. Bjontegaard, and A. Luthra, "Overview of the H. 264/AVC video coding standard," IEEE Transactions on Circuits and Systems for Video Technology, vol. 13, no. 7, pp. 560-576, 2003.

[2] G. J. Sullivan, J.-R. Ohm, W.-J. Han, and T. Wiegand, "Overview of the high efficiency video coding (HEVC) standard," IEEE Transactions on Circuits and Systems for Video Technology, vol. 22, no. 12, pp. 1649-1668, 2012.

[3] B. Bross, Y.-K. Wang, Y. Ye, S. Liu, J. Chen, G. J. Sullivan, and J. R. Ohm, "Overview of the versatile video coding (VVC) standard and its applications," IEEE Transactions on Circuits and Systems for Video Technology, vol. 31, no. 10, pp. 3736-3764, 2021.

[4] S. Ma, X. Zhang, C. Jia, Z. Zhao, S. Wang, and S. Wang, "Image and video compression with neural networks: A review," IEEE Transactions on Circuits and Systems for Video Technology, vol. 30, no. 6, pp. 1683-1698, 2019.

[5] K. He, X. Zhang, S. Ren, and J. Sun, "Deep residual learning for image recognition," in Proceedings of the IEEE Conference on Computer Vision and Pattern Recognition, 2016, pp. 770-778.

[6] A. Dosovitskiy, L. Beyer, A. Kolesnikov, D. Weissenborn, X. Zhai, T. Unterthiner, M. Dehghani, M. Minderer, G. Heigold, S. Gelly et al., "An image is worth 16×16 words: Transformers for image recognition at scale," in International Conference on Learning Representations, 2020.

[7] Z. Liu, Y. Lin, Y. Cao, H. Hu, Y. Wei, Z. Zhang, S. Lin, and B. Guo, "Swin Transformer: Hierarchical vision transformer using shifted windows," in Proceedings of the IEEE International Conference on Computer Vision, 2021, pp. 10012-10022.

[8] D. Liu, Y. Li, J. Lin, H. Li, and F. Wu, "Deep learning-based video coding: A review and a case study," ACM Computing Surveys, vol. 53, no. 1, pp. 1-35, 2020.

[9] D. Ding, Z. Ma, D. Chen, Q. Chen, Z. Liu, and F. Zhu, "Advances in video [9] compression system using deep neural network: A review and case studies," Proceedings of the IEEE, vol. 109, no. 9, pp. 1494-1520, 2021.

[10] Y. Zhang, S. Kwong, and S. Wang, "Machine learning based video coding optimizations: A survey," Information Sciences, vol. 506, pp. 395-423, 2020.

[11] J. Balle, V. Laparra, and E. P. Simoncelli, "End-to-end optimized image compression," in International Conference on Learning Representations, 2017.

[12] Z. Cheng, H. Sun, M. Takeuchi, and J. Katto, "Learned image compression with discretized gaussian mixture likelihoods and attention modules," in Proceedings of the IEEE Conference on Computer Vision and Pattern Recognition, 2020, pp. 7939 7948.

[13] G. Lu, W. Ouyang, D. Xu, X. Zhang, C. Cai, and Z. Gao, "DVC: An end-to-end deep video compression framework," in Proceedings of the IEEE International Conference on Computer Vision, 2019, pp. 11006-11015.

[14] T. Ladune, P. Philippe, W. Hamidouche, L. Zhang, and O. Deforges,' "Optical flow and mode selection for learning-based video coding," in IEEE International Workshop on Multimedia Signal Processing, 2020, pp. 1-6.

[15] J. Li, B. Li, and Y. Lu, "Deep contextual video compression," Proceedings of Advances in Neural Information Processing Systems, vol. 34, pp. 18114-18125, 2021.

[16] C. D. Pham, C. Fu, and J. Zhou, "Deep learning based spatial-temporal in-loop filtering for versatile video coding," in Proceedings of the IEEE Conference on Computer Vision and Pattern Recognition, 2021, pp. 1861-1865.

[17] F. Zhang, C. Feng, and D. R. Bull, "Enhancing VVC through CNNbased post-processing," in Proceedings of International Conference on Multimedia and Expo, 2020, pp. 1-6.

[18] D. Ma, F. Zhang, and D. R. Bull, "MFRNet: A new CNN architecture for post-processing and in-loop filtering," IEEE Journal of Selected Topics in Signal Processing, vol. 15, no. 2, pp. 378-387, 2020.

[19] W. Fedus, B. Zoph, and N. Shazeer, "Switch Transformers: Scaling to trillion parameter models with simple and efficient sparsity," The Journal of Machine Learning Research, vol. 23, no. 1, pp. 5232-5270, 2022.

[20] Y. Liu, M. Ott, N. Goyal, J. Du, M. Joshi, D. Chen, O. Levy, M. Lewis, L. Zettlemoyer, and V. Stoyanov, "Roberta: A robustly optimized bert pretraining approach," arXiv preprint arXiv: 1907.11692, 2019.

[21] A. Vaswani, N. Shazeer, N. Parmar, J. Uszkoreit, L. Jones, A. N. Gomez, Ł. Kaiser, and I. Polosukhin, "Attention is all you need," Proceedings of Advances in Neural Information Processing Systems, vol. 30, 2017.

[22] Y. Mei, Y. Fan, Y. Zhang, J. Yu, Y. Zhou, D. Liu, Y. Fu, T. S. Huang, and H. Shi, "Pyramid attention networks for restoration," image arXiv preprint arXiv: 2004.13824, 2020.

[23] S. W. Zamir, A. Arora, S. Khan, M. Hayat, F. S. Khan, and M.-H. Yang, "Restormer: Efficient transformer for high-resolution image restoration," in Proceedings of the IEEE Conference on Computer Vision and Pattern Recognition, 2022, pp. 5728-5739.

[24] G. K. Wallace, "The JPEG still picture compression standard," IEEE Transactions on Consumer Electronics, vol. 38, no. 1, 1992.

[25] C. Christopoulos, A. Skodras, and T. Ebrahimi, "The jpeg2000 still image coding system: an overview," IEEE Transactions on Consumer Electronics, vol. 46, no. 4, pp. 1103-1127, 2000.

[26] F. Bellard, "Bpg image fromat," 2015, [online available] at https://bellard.org/bpg/.

[27] J. Balle, D. Minnen, S. Singh, S. J. Hwang, and N. Johnston, "Vari-'ational image compression with a scale hyperprior," arXiv preprint arXiv: 1802.01436, 2018.

[28] D. Minnen, J. Balle, and G. D. Toderici, "Joint autoregressive and' hierarchical priors for learned image compression," Proceedings of Advances in Neural Information Processing Systems, vol. 31, 2018.

[29] J. Lee, S. Cho, and S.-K. Beack, "Context-adaptive entropy model for end-to-end optimized image compression," arXiv preprint arXiv: 1809.10452, 2018.

[30] F. Mentzer, E. Agustsson, M. Tschannen, R. Timofte, and L. Van Gool, "Conditional probability models for deep image compression," in Proceedings of the IEEE Conference on Computer Vision and Pattern Recognition, 2018, pp. 4394-4402.

[31] Y. Hu, W. Yang, and J. Liu, "Coarse-to-fine hyper-prior modeling for learned image compression," in Proceedings of the AAAI Conference on Artificial Intelligence, vol. 34, no. 07, 2020, pp. 11013-11020.

[32] H. Liu, Y. Zhang, H. Zhang, C. Fan, S. Kwong, C.-C. J. Kuo, and X. Fan, "Deep learning-based picture-wise just noticeable distortion prediction model for image compression," IEEE Transactions on Image Processing, vol. 29, pp. 641 656, 2019.

[33] G. Toderici, S. M. O'Malley, S. J. Hwang, D. Vincent, D. Minnen, S. Baluja, M. Covell, and R. Sukthankar, "Variable rate image compression with recurrent neural networks," arXiv preprint arXiv: 1511.06085, 2015.

[34] G. Toderici, D. Vincent, N. Johnston, S. Jin Hwang, D. Minnen, J. Shor, and M. Covell, "Full resolution image compression with recurrent neural networks," in Proceedings of the IEEE Conference on Computer Vision and Pattern Recognition, 2017, pp. 5306-5314.

[35] N. Johnston, D. Vincent, D. Minnen, M. Covell, S. Singh, T. Chinen, S. J. Hwang, J. Shor, and G. Toderici, "Improved lossy image compression with priming and spatially adaptive bit rates for recurrent networks," in Proceedings of the IEEE Conference on Computer Vision and Pattern Recognition, 2018, pp. 4385-4393.

[36] E. Agustsson, M. Tschannen, F. Mentzer, R. Timofte, and L. V. Gool, "Generative adversarial networks for extreme learned image compression," in Proceedings of the IEEE International Conference on Computer Vision, 2019, pp. 221-231.

[37] F. Mentzer, G. D. Toderici, M. Tschannen, and E. Agustsson, "Highfidelity generative image compression," Proceedings of Advances in Neural Information Processing Systems, vol. 33, pp. 11913-11924, 2020.

[38] T. Zhao, Y. Huang, W. Feng, Y. Xu, and S. Kwong, "Efficient VVC intra prediction based on deep feature fusion and probability estimation," IEEE Transactions on Multimedia, 2022.

[39] L. Zhu, Y. Zhang, N. Li, G. Jiang, and S. Kwong, "Deep learning-based intra mode derivation for versatile video coding," ACM Transactions on Multimedia Computing, Communications and Applications, vol. 19, no. 2s, pp. 1-20, 2023.

[40] G. Lu, X. Zhang, W. Ouyang, L. Chen, Z. Gao, and D. Xu, "An end-toend learning framework for video compression," IEEE Transactions on Pattern Analysis and Machine Intelligence, vol. 43, no. 10, pp. 3292-3308, 2020.

[41] Z. Hu, Z. Chen, D. Xu, G. Lu, W. Ouyang, and S. Gu, "Improving deep video compression by resolution-adaptive flow coding," in Proceedings of the European Conference on Computer Vision, 2020, pp. 193-209.

[42] Z. Hu, G. Lu, and D. Xu, "FVC: A new framework towards deep video compression in feature space," in Proceedings of the IEEE Conference on Computer Vision and Pattern Recognition, 2021, pp. 1502-1511.

[43] Z. Hu, G. Lu, J. Guo, S. Liu, W. Jiang, and D. Xu, "Coarse-ToFine Deep Video Coding With Hyperprior-Guided Mode Prediction," in Proceedings of the IEEE Conference on Computer Vision and Pattern Recognition, 2022, pp. 5921-5930.

[44] E. Agustsson, D. Minnen, N. Johnston, J. Balle, S. J. Hwang, and G. Toderici, "Scale-space flow for end-to-end optimized video compression," in Proceedings of the IEEE Conference on Computer Vision and Pattern Recognition, 2020, pp. 8503-8512.

[45] K. Lin, C. Jia, X. Zhang, S. Wang, S. Ma, and W. Gao, "DMVC: Decomposed motion modeling for learned video compression," IEEE Transactions on Circuits and Systems for Video Technology, 2022.

[46] H. Guo, S. Kwong, C. Jia, and S. Wang, "Enhanced motion compensation for deep video compression," IEEE Signal Processing Letters, 2023.

[47] F. Mentzer, G. Toderici, D. Minnen, S.-J. Hwang, S. Caelles, M. Lucic, and E. Agustsson, "VCT: A video compression transformer," arXiv preprint arXiv: 2206.07307, 2022.

[48] X. Sheng, J. Li, B. Li, L. Li, D. Liu, and Y. Lu, "Temporal context mining for learned video compression," IEEE Transactions on Multimedia, 2022.

[49] J. Li, B. Li, and Y. Lu, "Hybrid spatial-temporal entropy modelling for neural video compression," in Proceedings of the ACM International Conference on Multimedia, 2022, pp. 1503-1511.

[50] J. Lin, D. Liu, H. Li, and F. Wu, "M-LVC: Multiple frames prediction for learned video compression," in Proceedings of the IEEE Conference on Computer Vision and Pattern Recognition, 2020, pp. 3546-3554.

[51] R. Yang, F. Mentzer, L. Van Gool, and R. Timofte, "Learning for video compression with recurrent auto-encoder and recurrent probability model," IEEE Journal of Selected Topics in Signal Processing, vol. 15, no. 2, pp. 388-401, 2020.

[52] R. Yang, F. Mentzer, L. V. Gool, and R. Timofte, "Learning for video compression with hierarchical quality and recurrent enhancement," in Proceedings of the IEEE Conference on Computer Vision and Pattern Recognition, 2020, pp. 6628-6637.

[53] R. Pourreza and T. Cohen, "Extending neural p-frame codecs for bframe coding," in Proceedings of the IEEE International Conference on Computer Vision, 2021, pp. 6680-6689.

[54] V. Sze, M. Budagavi, and G. J. Sullivan, "High efficiency video coding (HEVC)," in Integrated Circuit and Systems, Algorithms and Architectures. Springer, 2014, vol. 39, p. 40.

[55] Y. Dai, D. Liu, and F. Wu, "A convolutional neural network approach for post-processing in hevc intra coding," in MultiMedia Modeling International Conference, 2017, pp. 28-39.

[56] Y. Zhang, T. Shen, X. Ji, Y. Zhang, R. Xiong, and Q. Dai, "Residual highway convolutional neural networks for in-loop filtering in HEVC," IEEE Transactions on Image Processing, vol. 27, no. 8, pp. 3827-3841, 2018.

[57] D. Ding, L. Kong, G. Chen, Z. Liu, and Y. Fang, "A switchable deep learning approach for in-loop filtering in video coding," IEEE Transactions on Circuits and Systems for Video Technology, vol. 30, no. 7, pp. 1871-1887, 2019.

[58] C. Jia, S. Wang, X. Zhang, S. Wang, J. Liu, S. Pu, and S. Ma, "Content-aware convolutional neural network for in-loop filtering in high efficiency video coding," IEEE Transactions on Image Processing, vol. 28, no. 7, pp. 3343-3356, 2019.

[59] Z. Pan, X. Yi, Y. Zhang, B. Jeon, and S. Kwong, "Efficient in-loop filtering based on enhanced deep convolutional neural networks for HEVC," IEEE Transactions on Image Processing, vol. 29, pp. 5352 5366, 2020.

[60] A. Ranjan and M. J. Black, "Optical flow estimation using a spatial pyramid network," in Proceedings of the IEEE Conference on Computer Vision and Pattern Recognition, 2017, pp. 4161-4170.

[61] Y. Tian, Y. Zhang, Y. Fu, and C. X. Tdan, "Temporally-deformable alignment network for video super-resolution," in Proceedings of the IEEE Conference on Computer Vision and Pattern Recognition, 2020, pp. 3357-3366.

[62] Y. Wu and K. He, "Group normalization," in Proceedings of the European Conference on Computer Vision, 2018, pp. 3-19.

[63] J. Xu, X. Sun, Z. Zhang, G. Zhao, and J. Lin, "Understanding and improving layer normalization," Proceedings of Advances in Neural Information Processing Systems, vol. 32, 2019.

[64] P. Luo, R. Zhang, J. Ren, Z. Peng, and J. Li, "Switchable normalization for learning-to-normalize deep representation," IEEE Transactions on Pattern Analysis and Machine Intelligence, vol. 43, no. 2, pp. 712-728, 2019.

[65] D. Hendrycks and K. Gimpel, "Gaussian error linear units," arXiv preprint arXiv: 1606.08415, 2016.

[66] Z. Wang, E. P. Simoncelli, and A. C. Bovik, "Multiscale structural similarity for image quality assessment," in Asilomar Conference on Signals, Systems and Computers, vol. 2, 2003, pp. 1398-1402.

[67] J. Balle, V. Laparra, and E. P. Simoncelli, "End-to-end optimization' of nonlinear transform codes for perceptual quality," in Picture Coding Symposium, 2016, pp. 1-5.

[68] T. Xue, B. Chen, J. Wu, D. Wei, and W. T. Freeman, "Video enhancement with task-oriented flow," International Journal of Computer Vision, vol. 127, no. 8, pp. 1106-1125, 2019.
[69] F. Bossen et al., "Common test conditions and software reference configurations," JCTVC-L1100, vol. 12, no. 7, 2013.
[70] A. Mercat, M. Viitanen, and J. Vanne, "UVG dataset: 50/120 fps 4 k sequences for video codec analysis and development," in Proceedings of the ACM Multimedia Systems Conference, 2020, pp. 297-302.
[71] H. Wang, W. Gan, S. Hu, J. Y. Lin, L. Jin, L. Song, P. Wang, I. Katsavounidis, A. Aaron, and C.-C. J. Kuo, "MCL-JCV: A JNDbased H. 264/AVC video quality assessment dataset," in Proceedings of International Conference on Image Processing, 2016, pp. 1509-1513.
[72] A. Paszke, S. Gross, F. Massa, A. Lerer, J. Bradbury, G. Chanan, T. Killeen, Z. Lin, N. Gimelshein, L. Antiga et al., "Pytorch: An imperative style, high-performance deep learning library," Proceedings of Advances in Neural Information Processing Systems, vol. 32, 2019.
[73] J. Begaint, F. Racap' e, S. Feltman, and A. Pushparaja, "Compressai:' a pytorch library and evaluation platform for end-to-end compression research," arXiv preprint arXiv: 2011.03029, 2020.
[74] I. Loshchilov and F. Hutter, "Decoupled weight decay regularization," arXiv preprint arXiv: 1711.05101, 2017.
G. Bjøntegaard, "Calculation of average psnr differences between rdcurves (vceg-m33)," in VCEG Meeting (ITU-T SG16 Q. 6), 2001, pp. 2-4.

The invention claimed is:

1. A computer-implemented method for learned video compression, comprising:
processing a current frame ($x_t$) and previously decoded frame ($\hat{x}_{t-1}$) of a video data using a motion estimation model to estimate a motion vector ($v_t$) for every pixel;
compressing the motion vectors ($v_t$) and reconstructing the motion vectors ($v_t$) to reconstructed motion vectors ($\hat{v}_t$);
applying an enhanced context mining (ECM) model to obtain enhanced context ($\ddot{C}_E$) from the reconstructed motion vectors ($\hat{v}_t$) and previously decoded frame feature ($\tilde{x}_{t-1}$); wherein applying the ECM comprises:
obtaining the motion vectors ($\hat{v}_t$) and decoded frame feature ($\tilde{x}_{t-1}$) based on the current input frame ($x_t$) and previously decoded frame ($\hat{x}_{t-1}$);
warping the motion vectors ($\hat{v}_t$) and decoded frame feature ($\tilde{x}_{t-1}$) to obtain a warped feature ($\ddot{x}_t$); and
processing the warped feature ($\ddot{x}_t$) using a resblock and convolution layer to obtain a context ($\ddot{x}_t$);
compressing the current frame ($x_t$) with the assistance of the enhanced context ($\ddot{C}_E$) to obtain a reconstructed frame ($\hat{x}'_t$); and
providing the reconstructed frame ($\hat{x}'_t$) to a post-enhancement backend network to obtain a high-resolution frame ($\hat{x}_t$).

2. The computer-implemented method of claim 1, wherein the motion estimation model is based on a spatial pyramid network.

3. The computer-implemented method of claim 1, wherein applying the enhanced context mining (ECM) model comprises utilizing cross-channel interaction and residual learning operation to reduce redundancy across context channels.

4. The computer-implemented method of claim 1, wherein applying the enhanced context mining (ECM) model further comprises:
incorporating convolution with ReLU on the context ($\ddot{x}_t$) to obtain residual context ($R_C$); and
adding the residual context ($R_C$) to the context ($\ddot{x}_t$) to obtain the enhanced context ($\ddot{C}_E$).

5. The computer-implemented method of claim 4, wherein incorporating convolution with ReLU on the context ($\ddot{x}_t$) comprises passing the context ($\ddot{x}_t$) through multiple layers of convolution and ReLU followed by one more convolution layer.

6. The computer-implemented method of claim 1, wherein the enhanced context mining (ECM) model is designed without batch normalization layers.

7. A computer-implemented method for learned video compression, comprising:
processing a current frame ($x_t$) and previously decoded frame ($\hat{x}_{t-1}$) of a video data using a motion estimation model to estimate a motion vector ($v_t$) for every pixel;
compressing the motion vectors ($v_t$) and reconstructing the motion vectors ($v_t$) to reconstructed motion vectors ($\hat{v}_t$);
applying an enhanced context mining (ECM) model to obtain enhanced context ($\ddot{C}_E$) from the reconstructed motion vectors ($\hat{v}_t$) and previously decoded frame feature ($\tilde{x}_{t-1}$);
compressing the current frame ($x_t$) with the assistance of the enhanced context ($\ddot{C}_E$) to obtain a reconstructed frame ($\hat{x}'_t$); wherein compressing the current frame ($x_t$) comprises:
concatenating the input frame ($x_t$) and the enhanced context ($\ddot{C}_E$) together;
processing the input frame ($x_t$) and the enhanced context ($\ddot{C}_E$) to obtain latent code ($y_t$) for entropy model; and
transforming the latent code back to pixel space with the assistance of the enhanced context ($\ddot{C}_E$) to obtain the reconstructed frame ($\hat{x}'_t$); and
providing the reconstructed frame ($\hat{x}'_t$) to a post-enhancement backend network to obtain a high-resolution frame ($\hat{x}_t$).

8. The computer-implemented method of claim 1, wherein the post-enhancement backend network is transformer-based.

9. The computer-implemented method of claim 1, wherein the post-enhancement backend network comprises multiple transposed gated transformer blocks (TGTBs) and multiple convolution layers.

10. A computer-implemented method for learned video compression, comprising:
processing a current frame ($x_t$) and previously decoded frame ($\hat{x}_{t-1}$) of a video data using a motion estimation model to estimate a motion vector ($v_t$) for every pixel;
compressing the motion vectors ($v_t$) and reconstructing the motion vectors ($v_t$) to reconstructed motion vectors ($\hat{v}_t$);
applying an enhanced context mining (ECM) model to obtain enhanced context ($\ddot{C}_E$) from the reconstructed motion vectors ($\hat{v}_t$) and previously decoded frame feature ($\tilde{x}_{t-1}$);
compressing the current frame ($x_t$) with the assistance of the enhanced context ($\ddot{C}_E$) to obtain a reconstructed frame ($\hat{x}'_t$); and
providing the reconstructed frame ($\hat{x}'_t$) to a post-enhancement backend network to obtain a high-resolution frame ($\hat{x}_t$); wherein providing the reconstructed frame ($\hat{x}'_t$) to the post-enhancement backend network comprises:
applying a convolution layer to the reconstructed frame ($\hat{x}'_t$) to obtain a low-level feature embedding $F_0 \in \mathbb{R}^{H \times W \times C}$, where H×W is the spatial height and width, and C denotes the channel numbers;
processing the low-level feature ($F_0$) using one or more transformer blocks to obtain a refined feature ($F_R$); and
applying a convolution layer to the refined feature ($F_R$) to obtain residual image $R \in \mathbb{R}^{H \times W \times 3}$ to which the reconstructed frame ($\hat{x}'_t$) is added according to the following equation to obtain $\hat{x}_t = \hat{x}'_t + R$, where $\hat{x}_t$ is a high-resolution frame.

11. The computer-implemented method of claim 10, wherein at least one of the transformer blocks comprises a transposed gated transformer block (TGTB) which is designed without layer normalization.

12. The computer-implemented method of claim 10, wherein at least one of the transformer blocks is modified to contain a multi-head transposed attention (MTA) and a gated feed-forward network (GFN).

13. The computer-implemented method of claim 12, wherein the multi-head transposed attention (MTA) comprises calculating self-attention across channels.

14. The computer-implemented method of claim 12, wherein the multi-head transposed attention (MTA) comprises applying depth-wise convolution.

15. The computer-implemented method of claim 12, wherein the multi-head transposed attention (MTA) generates, from a feature input $X \in \mathbb{R}^{H \times W \times C}$, query (Q), key (K) and value (V) projections with the local context, and reshapes the query (Q) to $\hat{H}\hat{W} \times \hat{C}$, and key (K) to $\hat{C} \times \hat{H}\hat{W}$, to obtain a transposed attention map of size $\mathbb{R}^{\hat{C} \times \hat{C}}$.

16. The computer-implemented method of claim 12,
wherein the gated feed-forward network (GFN) comprises gating mechanism and depth wise convolutions,
wherein the gating mechanism is achieved as the element-wise product of two parallel paths of transformation layers, one of which is activated with the GELU non-linearity, and
wherein the depth-wise convolution is applied to obtain information from spatially neighboring pixel positions.

17. A system for learned video compression, comprising:
one or more processors; and
memory storing one or more programs configured to be executed by the one or more processors, the one or more programs including instructions for performing or facilitating performing of the computer-implemented method of claim 1.

18. A non-transitory computer readable medium having instructions stored thereon which, when executed by one or more processors, cause the one or more processors to execute the computer-implemented method of claim 1.

* * * * *